(12) United States Patent  
Stadelmayer et al.

(10) Patent No.: US 12,529,777 B2  
(45) Date of Patent: Jan. 20, 2026

(54) RADAR-BASED MOTION CLASSIFICATION USING ONE OR MORE TIME SERIES

(71) Applicant: Infineon Technologies AG, Neubiberg (DE)

(72) Inventors: Thomas Reinhold Stadelmayer, Wenzenbach (DE); Avik Santra, Munich (DE)

(73) Assignee: Infineon Technologies AG, Neubiberg (DE)

( * ) Notice: Subject to any disclaimer, the term of this patent is extended or adjusted under 35 U.S.C. 154(b) by 543 days.

(21) Appl. No.: 17/935,765

(22) Filed: Sep. 27, 2022

(65) Prior Publication Data

US 2023/0108140 A1 Apr. 6, 2023

(30) Foreign Application Priority Data

Oct. 5, 2021 (EP) .................................... 21201047

(51) Int. Cl.  
*G01S 13/58* (2006.01)  
*G01S 7/02* (2006.01)

(52) U.S. Cl.  
CPC .............. *G01S 13/58* (2013.01); *G01S 7/021* (2013.01)

(58) Field of Classification Search  
CPC .......... G01S 7/415; G01S 7/417; G01S 7/021; G01S 13/89; G01S 13/584; G01S 13/931; G01S 13/58  
USPC ................................................ 342/103, 104  
See application file for complete search history.

(56) References Cited

U.S. PATENT DOCUMENTS

| | | | | |
|---|---|---|---|---|
| 4,403,314 A | * | 9/1983 | Tournois | G01S 7/5209 367/101 |
| 4,538,152 A | * | 8/1985 | Wirth | G01S 13/536 342/383 |
| 4,804,962 A | * | 2/1989 | Picquendar | H03H 7/1783 342/159 |
| 4,851,848 A | * | 7/1989 | Wehner | G01S 13/9011 342/201 |
| 5,093,649 A | * | 3/1992 | Johnson | H01Q 3/10 342/147 |
| 7,898,468 B2 | * | 3/2011 | Samaniego | G01S 13/56 342/25 R |
| 8,049,657 B2 | * | 11/2011 | Prats | G01S 13/904 342/25 C |

(Continued)

OTHER PUBLICATIONS

Dubey, Anand et al., "A Bayesian Framework for Integrated Deep Metric Learning and Tracking of Vulnerable Road Users Using Automotive Radars", IEEE Access (vol. 9), May 5, 2021, pp. 68758-68777.

(Continued)

*Primary Examiner* — Michael W Justice  
(74) *Attorney, Agent, or Firm* — Slater Matsil, LLP

(57) ABSTRACT

In accordance with an embodiment, a computer-implemented method includes obtaining a time sequence of measurement frames of a radar measurement of a scene comprising an object; based on multiple subsequent measurement frames of the time sequence of measurement frames, determining one or more one-dimensional (1-D) time series of respective observables of the radar measurement associated with the object; and based on the one or more 1-D time series, determining a motion class of a motion performed by the object using a classification algorithm.

21 Claims, 13 Drawing Sheets

(56) References Cited

U.S. PATENT DOCUMENTS

| | | | | |
|---|---|---|---|---|
| 8,314,732 | B2* | 11/2012 | Oswald | G01S 7/2926 |
| | | | | 342/195 |
| 9,291,659 | B2* | 3/2016 | Ebling | G01S 13/931 |
| 9,568,600 | B2* | 2/2017 | Alland | G01S 7/2925 |
| 9,575,160 | B1* | 2/2017 | Davis | G01S 7/35 |
| 9,599,702 | B1* | 3/2017 | Bordes | G01S 13/18 |
| 9,720,073 | B1* | 8/2017 | Davis | G01S 13/325 |
| 9,753,132 | B1* | 9/2017 | Bordes | G01S 13/325 |
| 9,784,820 | B2* | 10/2017 | Arage | G01S 13/931 |
| 9,952,313 | B2* | 4/2018 | Cho | G01S 7/4004 |
| 10,006,991 | B2* | 6/2018 | Winstead | G01S 13/585 |
| 10,073,171 | B2* | 9/2018 | Bordes | G01S 13/50 |
| 10,168,420 | B1* | 1/2019 | Fluhler | G01S 13/536 |
| 10,404,387 | B1* | 9/2019 | Devison | H04B 17/309 |
| 10,576,328 | B2* | 3/2020 | Santra | G01S 13/42 |
| 10,605,894 | B2* | 3/2020 | Davis | G01S 7/36 |
| 10,620,304 | B2* | 4/2020 | Halbert | G01S 7/003 |
| 10,768,291 | B2* | 9/2020 | Hammes | G01S 13/343 |
| 10,855,328 | B1* | 12/2020 | Gulati | G01S 7/0234 |
| 11,163,050 | B2* | 11/2021 | Bharadia | G01S 13/42 |
| 11,209,536 | B2* | 12/2021 | Joshi | G01S 13/538 |
| 11,275,928 | B2* | 3/2022 | Rassool | G06V 40/40 |
| 11,313,950 | B2* | 4/2022 | Kruglick | G01S 7/417 |
| 11,467,254 | B2* | 10/2022 | Chen | G01S 7/418 |
| 11,567,580 | B2* | 1/2023 | Nguyen | G06F 3/017 |
| 11,637,575 | B2* | 4/2023 | Ota | H04L 27/261 |
| | | | | 370/329 |
| 11,754,704 | B2* | 9/2023 | Ikefuji | G01S 13/9004 |
| | | | | 342/25 A |
| 11,822,007 | B2* | 11/2023 | Novoselsky | G01S 7/412 |
| 12,140,696 | B2* | 11/2024 | Chen | G01S 7/417 |
| 12,158,539 | B2* | 12/2024 | Brosche | G01S 13/589 |
| 2009/0207067 | A1* | 8/2009 | Samaniego | G01S 13/888 |
| | | | | 342/25 A |
| 2010/0109938 | A1* | 5/2010 | Oswald | G01S 13/522 |
| | | | | 707/E17.014 |
| 2010/0207808 | A1* | 8/2010 | Prats | G01S 13/904 |
| | | | | 342/25 F |
| 2015/0177303 | A1* | 6/2015 | Ebling | G01S 7/4026 |
| | | | | 342/27 |
| 2015/0253419 | A1* | 9/2015 | Alland | G01S 7/03 |
| | | | | 342/385 |
| 2015/0253420 | A1* | 9/2015 | Alland | G01S 7/03 |
| | | | | 342/156 |
| 2016/0084941 | A1* | 3/2016 | Arage | G01S 7/2921 |
| | | | | 342/91 |
| 2016/0266245 | A1* | 9/2016 | Bharadia | G01S 7/038 |
| 2017/0016979 | A1* | 1/2017 | Cho | G01S 7/4004 |
| 2017/0090026 | A1* | 3/2017 | Joshi | G01S 13/87 |
| 2017/0285158 | A1* | 10/2017 | Halbert | G01S 7/414 |
| 2017/0336495 | A1* | 11/2017 | Davis | G01S 7/35 |
| 2017/0363731 | A1* | 12/2017 | Bordes | G01S 7/354 |
| 2018/0074187 | A1* | 3/2018 | Winstead | G01S 13/588 |
| 2019/0240535 | A1* | 8/2019 | Santra | A61B 5/05 |
| 2019/0243464 | A1* | 8/2019 | Lien | G01S 7/415 |
| 2019/0346544 | A1* | 11/2019 | Hammes | G01S 13/931 |
| 2020/0033442 | A1* | 1/2020 | Gulati | H04K 1/00 |
| 2020/0096595 | A1* | 3/2020 | Kishigami | G01S 7/295 |
| 2020/0225321 | A1* | 7/2020 | Kruglick | G01S 7/417 |
| 2020/0271756 | A1* | 8/2020 | Novoselsky | G01S 7/417 |
| 2021/0165074 | A1* | 6/2021 | Brosche | G01S 13/931 |
| 2021/0182539 | A1* | 6/2021 | Rassool | G06V 30/19173 |
| 2021/0232228 | A1* | 7/2021 | Nguyen | G06F 3/017 |
| 2021/0270936 | A1* | 9/2021 | Chen | G06F 3/011 |
| 2021/0281453 | A1* | 9/2021 | Ota | H04B 1/10 |
| 2021/0396843 | A1* | 12/2021 | Santra | G01S 7/415 |
| 2022/0179065 | A1* | 6/2022 | Ikefuji | G06T 7/00 |
| 2022/0196798 | A1* | 6/2022 | Chen | G01S 7/354 |

OTHER PUBLICATIONS

Ge, Weifeng et al., "Deep Metric Learning with Hierarchical Triplet Loss", ECCV Computer Vision and Pattern Recognition, Oct. 16, 2018, 17 pages.

Rautaray, S., et al., "Vision based hand gesture classification for human computer interaction: a survey", Artificial Intelligence Review 43, 1, https://doi.org/10.1007/s10462-012-9356-9, Nov. 6, 2012, 54 pages.

Stadelmayer, Thomas et al., "Improved Target Detection and Feature Extraction using a Complex-Valued Adaptive Sinc Filter on Radar Time Domain Data", EUSIPCO, Aug. 2021, 6 pages.

Stadelmayer, Thomas et al., "Human Activity Classification Using mm-Wave FMCW Radar by Improved Representation Learning", ACM Digital Library, https://doi.org/10.1145/3412060.3418430, Sep. 29, 2020, 6 pages.

Stadelmayer, Thomas et al., "Data-Driven Radar Processing Using a Parametric Convolutional Neural Network for Human Activity Classification", IEEE Sensors Journal, vol. 21, No. 17, Sep. 2021, 12 pages.

* cited by examiner

RADAR-BASED MOTION CLASSIFICATION USING ONE OR MORE TIME SERIES

This application claims the benefit of European Patent Application No. 21201047, filed on Oct. 5, 2021, which application is hereby incorporated herein by reference.

TECHNICAL FIELD

Various examples of the disclosure are broadly concerned with recognizing motions such as gestures based on a radar measurement.

BACKGROUND

Human-machine interaction (HMI) can be facilitated by gesture classification (sometimes also referred to as gesture recognition). For instance, hand or finger gestures can be recognized and classified. Gesture classification finds applications in smartphones, sign language interfaces, automotive infotainment systems, augmented reality-virtual reality systems and smart appliances. Further, gesture classification can facilitate HMI for vending and ticketing machines at public places.

Traditionally, gesture classification is based on camera images. See, e.g., S. Rautaray and A. Agrawal. 2015. *Vision based hand gesture classification for human computer interaction: a survey*. Artificial Intelligence Review 43, 1-54 (2015). However, camera-based gesture classification suffers from the problems of requiring proper illumination conditions, occlusions from clothing, obstruction at camera lens opening, and privacy intruding features.

Since radar measurements are not or at least less severely affected by many of such limitations like improper lightning and privacy issues, radar-based gesture classification provides an attractive alternative. Further, the processing and memory footprint of the solution can be relatively thin making them favorable for embedded implementation.

It has been observed that such gesture recognition based on radar measurements using known techniques can sometimes show limited accuracy (e.g., in terms of recognition rate) and/or slow reaction time.

SUMMARY

A computer-implemented method includes obtaining a time sequence of measurement frames of a radar measurement of a scene. The scene includes an object. The method also includes determining one or more one dimensional time series of respective observables of the radar measurement based on multiple subsequent measurement frames. The observables are associated with the object. The method further includes, based on the one or more one dimensional time series, determining a motion class of a motion that is performed by the object using a classification algorithm.

A computer program or a computer-program production or a computer-readable storage medium includes program code. The program code can be loaded and executed by at least one processor. Upon loading and executing the program code, the at least one processor performs a method. The method includes obtaining a time sequence of measurement frames of a radar measurement of a scene. The scene includes an object. The method also includes determining one or more one dimensional time series of respective observables of the radar measurement based on multiple subsequent measurement frames. The observables are associated with the object. The method further includes, based on the one or more one dimensional time series, determining a motion class of a motion that is performed by the object using a classification algorithm.

A device includes a processor. The processor is configured to obtain a time sequence of measurement frames of a radar measurement of a scene including an object. The processor is further configured to determine one or more one dimensional time series of respective observables of the radar measurement associated with the object. The processor is further configured to determine a motion class of a motion performed by the object using a classification algorithm based on the one or more one dimensional time series.

A computer-implemented method of training a convolutional neural network for predicting a gesture class of a motion performed by an object based on a time sequence of measurement frames of a radar measurement of a scene including the object is provided. The convolutional neural network algorithm includes an output layer that determines a Euclidean distance between an input sample vector and class weights of each one of a plurality of candidate motion classes. The method includes obtaining multiple training sets. Each training set includes a respective time sequence of measurement frames and an associated ground-truth label. The ground-truth labels indicative of a respective candidate motion class selected from the plurality of candidate motion classes. The method further includes training the convolutional neural network algorithm based on a first loss that penalizes the Euclidean distance to the class weights of the respective candidate motion class and indicated by the ground-truth label, as well as further based on a second loss that rewards the Euclidean distance to the class weights of other candidate motion classes not indicated by the ground-truth label.

A computer program or a computer-program production or a computer-readable storage medium includes program code. The program code can be loaded and executed by at least one processor. Upon loading and executing the program code, the at least one processor performs a method of training a convolutional neural network for predicting a gesture class of a motion performed by an object based on a time sequence of measurement frames of a radar measurement of a scene including the object is provided. The convolutional neural network algorithm includes an output layer that determines a Euclidean distance between an input sample vector and class weights of each one of a plurality of candidate motion classes. The method includes obtaining multiple training sets. Each training set includes a respective time sequence of measurement frames and an associated ground-truth label. The ground-truth labels indicative of a respective candidate motion class selected from the plurality of candidate motion classes. The method further includes training the convolutional neural network algorithm based on a first loss that penalizes the Euclidean distance to the class weights of the respective candidate motion class and indicated by the ground-truth label, as well as further based on a second loss that rewards the Euclidean distance to the class weights of other candidate motion classes not indicated by the ground-truth label.

A device includes a processor. The processor is configured for training a convolutional neural network for predicting a gesture class of a motion performed by an object based on a time sequence of measurement frames of a radar measurement of a scene including the object is provided. The convolutional neural network algorithm includes an output layer that determines a Euclidean distance between an input sample vector and class weights of each one of a plurality of candidate motion classes. The processor is configured to obtain multiple training sets. Each training set includes a respective time sequence of measurement frames and an associated ground-truth label. The ground-truth labels indicative of a respective candidate motion class selected from the plurality of candidate motion classes. The computer is further configured to train the convolutional neural network algorithm based on a first loss that penalizes the Euclidean distance to the class weights of the respective candidate motion class and indicated by the ground-truth label, as well as further based on a second loss that rewards the Euclidean distance to the class weights of other candidate motion classes not indicated by the ground-truth label.

It is to be understood that the features mentioned above and those yet to be explained below may be used not only in the respective combinations indicated, but also in other combinations or in isolation without departing from the scope of the invention.

DETAILED DESCRIPTION OF ILLUSTRATIVE EMBODIMENTS

Figure 1:
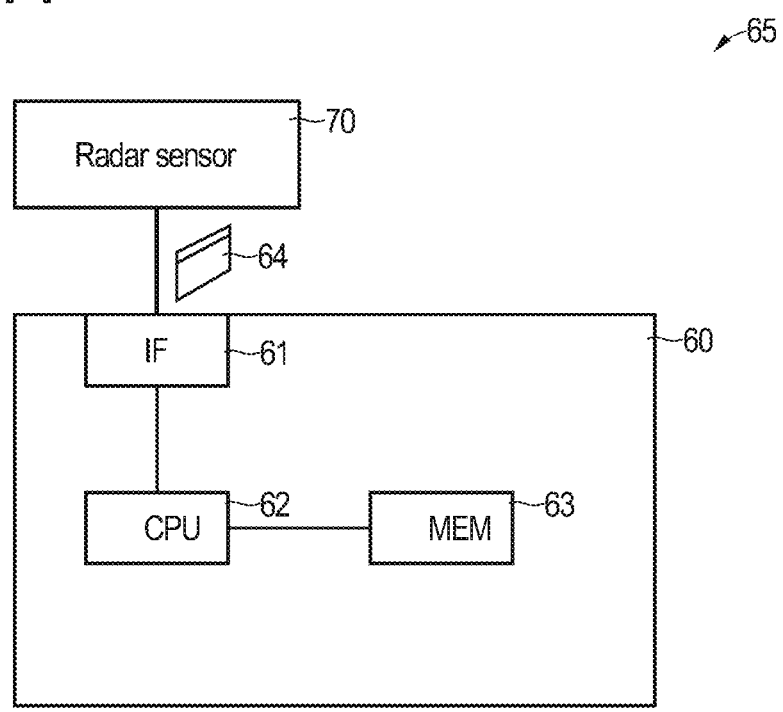
FIG. 1 schematically illustrates a system including a radar sensor and a processing device according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, examples of the disclosure will be described in detail with reference to the accompanying drawings. It is to be understood that the following description of examples is not to be taken in a limiting sense. The scope of the disclosure is not intended to be limited by the examples described hereinafter or by the drawings, which are taken to be illustrative only.

The drawings are not to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connections or coupling. A coupling between components may also be established over a wireless connection. Functional blocks may be implemented in hardware, firmware, software, or a combination thereof.

Various examples of the disclosure generally relate to motion classification. The disclosed techniques can be used to recognize and classify various types of motions.

Some embodiments are directed to advanced techniques of gesture classification or classification of other motions based on radar measurements and/or gesture recognition using radar measurements having high accuracy at low reaction times.

For instance, it would be possible to determine a gesture class of a gesture performed by an object. In particular, using the techniques described herein, hand gestures or finger gestures or gestures performed using a handheld object can be recognized. Such object can perform the gesture in free space. I.e., the gesture may be defined by a 3-D motion of the object, e.g., along a trajectory and/or including self-rotation. It would also be possible to recognize other kinds and types of gestures, e.g., body-pose gestures or facial expression gestures.

Various gesture classes are conceivable. The particular choice of the set of gesture classes used for the gesture classification is not germane for the functioning of the techniques described herein. Nonetheless, hereinafter, a few examples will be given for possible gesture classes:
  (1) Swipe left to right
  (2) Swipe right to left
  (3) Swipe top to down
  (4) Swipe down to top
  (5) Circle clockwise
  (6) Circle anti-clockwise
  (7) Swipe back to front
  (8) Swipe front to back
  (9) Finger wave—wave single fingers
  (10) Finger rub—thumb sliding over fingers TAB. 1: examples of various gesture classes that could be used in a respective predefined set to implement the gesture classification. These gesture classes define the gestures that can be recognized. Further details with respect to such gesture classes will be explained in connection with FIG. 3.

Other examples of motion classification would pertain to kick motion classification. Smart Trunk Opener (STO) is a concept of opening and closing a trunk or door of a vehicle without using keys, automatic and hands-free. A kick-to-open motion is performed by the user using the foot. STO provides a flexible approach to the user by recognizing and classifying the hand movement or leg kick of the user and transmits the intention of the authorized user to open or close the trunk or door.

Another example pertains to a door handle presenter. Here, upon a motion in the vicinity of the door handle, the door handle is moved from a retracted position to an exposed position in which it can be actuated.

In detail, motion classification can used to predict a motion class of a motion, e.g., a gesture. For example, there can be a predefined set of motion classes. Then, once such an object performs a motion, it can be judged whether this motion is part of one of the motion classes. For this, it can be judged whether certain features of the motion match respective feature ranges associated with the motion class.

In some examples, optionally, it would be possible to determine that the motion is not part of any one of the gesture classes—but, e.g., rather is part of a yet-to-be-defined motion class or corresponds to a general object movement not resembling a gesture. I.e., new motion classes can be identified.

Based on a motion classification, various applications can be facilitated. For example, an HMI can be implemented. It is possible to control a machine. For instance, different actions could be triggered depending on the motion class of the recognized gesture. The HMI can facilitate control of a machine by a user. As a general rule, the techniques described herein are not limited to a particular use case of the HMI. Example use cases include: motion-controlled wearable and mobile devices, motion-controlled smart TVs, projectors, gesture-controlled smart homes and smart devices, automotive infotainment systems, augmented reality-virtual reality (AR-VR), feedback systems. Motion classification can replace alleviate the need for touch and clicks needed for HMI.

Hereinafter, for sake of simplicity, reference will be made primarily to gesture classification; however, similar techniques may be readily applied to other types of motion, e.g., STO use cases.

Various techniques disclosed herein employ a radar measurement of a scene including an object—e.g., a hand or finger or handheld object such as a stylus or beacon—to acquire data based on which the gesture classification can be implemented. For instance, a short-range radar measurement could be implemented. Here, radar chirps can be used to measure a position of one or more objects in a scene having extents of tens of centimeters or meters.

According to the various examples disclosed herein, a millimeter-wave radar sensor may be used to perform the radar measurement; the radar sensor operates as a frequency-modulated continuous-wave (FMCW) radar that includes a millimeter-wave radar sensor circuit, one or more transmitters, and one or more receivers. A millimeter-wave radar sensor may transmit and receive signals in the 20 GHz to 122 GHz range. Alternatively, frequencies outside of this range, such as frequencies between 1 GHz and 20 GHz, or frequencies between 122 GHz and 300 GHz, may also be used.

A radar sensor can transmit a plurality of radar pulses, such as chirps, towards a scene. This refers to a pulsed operation. In some embodiments the chirps are linear chirps, i.e., the instantaneous frequency of the chirps varies linearly with time.

A Doppler frequency shift can be used to determine a velocity of the target. Measurement data provided by the radar sensor can thus indicate depth positions of multiple objects of a scene. It would also be possible that velocities are indicated.

The radar sensor can output measurement frames. As a general rule, the measurement frames (sometimes also referred to as data frames or physical frames) include data samples over a certain sampling time for multiple radar pulses, specifically chirps. Slow time is incremented from chirp-to-chirp; fast time is incremented for subsequent samples. A channel dimension may be used that addresses different antennas. The radar sensor outputs a time sequence of measurement frames.

Compared to camera-based gesture classification, gesture classification based on a radar measurements can have some advantages such as: invariant to illumination conditions; hand visibility occlusions; preserving privacy; capable of capturing subtle hand gesture motions.

According to various examples, different kinds and types of classification algorithms for determining a gesture class (or, more generally, a motion class) can be used. For instance, a heuristic-based classification algorithm that is manually parametrized could be used. It would also be possible to employ a machine-learning (ML) algorithm to predict a gesture class of a gesture performed by an object.

An example implementation of the ML algorithm is a neural network algorithm (hereinafter, simply neural network, NN). An NN generally includes a plurality of nodes that can be arranged in multiple layers. Nodes of given layer are connected with one or more nodes of a subsequent layer. Skip connections between non-adjacent layers are also possible. Generally, connections are also referred to as edges. The output of each node can be computed based on the values of each one of the one or more nodes connected to the input. Nonlinear calculations are possible. Different layers can perform different transformations such as, e.g., pooling, max-pooling, weighted or unweighted summing, non-linear activation, convolution, etc. The NN can include multiple hidden layers, arranged between an input layer and an output layer. An example NN is a convolutional NN (CNN). Here, 1-D or 2-D convolutional layers are used, together with other layers.

For classification, it is possible to use a Softmax classification layer at the output. Here, a Softmax function is used and a cross-entropy loss is typically used during training.

The calculation performed by the nodes are set by respective weights associated with the nodes. The weights can be determined in a training of the NN. For this, a numerical optimization can be used to set the weights. A loss function can be defined between an output of the NN in its current training can then minimize the loss function. For this, a gradient descent technique may be employed where weights are adjusted from back-to-front of the NN.

There can be a spatial contraction and a spatial expansion implemented by one or more encoder branches and one or more decoder branches, respectively. I.e., the x-y-resolution of the input data and the output data may be decreased (increased) from layer to layer along the one or more encoder branches (decoder branches). The encoder branch provides a contraction of the input data, and the decoder branch provides an expansion.

At the same time, feature channels can increase and decrease along the one or more encoder branches and the one or more decoder branches, respectively. The one or more encoder branches and the one or more decoder branches are connected via a bottleneck.

A particular implementation of the NN is an auto-encoder NN (AENN). The AENN, as a general rule, includes an encoder branch and a decoder branch that are sequentially arranged and connected via a bottleneck. Away from the input layer and the output layer and specifically at the bottleneck, latent feature representations (feature embeddings) are obtained.

The feature embedding can specify the presence or absence of certain features. The feature embedding thus can be seen as a compressed form of the input.

For the AENN, based on the feature embedding, using the decoder branch, the aim is to re-construct the input. Thus, a loss function can be defined during training of the AENN that penalizes differences between the input and the output. Accordingly, it is possible to train the AENN using unsupervised learning.

According to various examples, the classification algorithm determines a gesture class of a gesture based on one or one-dimensional (1-D) time series of respective observables of a radar measurement associated with an object.

For example, the one or more 1-D time series can be the input to the classification algorithm or may be further pre-processed and then serve as the input to the classification algorithm.

Each 1-D time series can specify the temporal evolution of the respective observable of the radar measurement. The observables can be quantified as real-valued numbers. For instance, it would be possible that one or more of the following observables are considered:

range; absolute signal level; elevation angle; azimuthal angle.

At the same time, such 1-D time series corresponds to a compact representation of the radar measurement data. For instance, conventional pre-processing is based on information in the entire range-Doppler domain which—for close-range gesture recognition—includes mostly irrelevant information at larger ranges or higher Doppler shifts. Accordingly, by using one or more 1-D time series, a compact gesture classification algorithm operating based on low-dimensional input data is facilitated.

Such gesture classification can be computational lightweight and, thus, can be executed on an embedded device, e.g., a smart phone or smart watch. Nonetheless, the reaction time of the gesture classification can be comparably low, e.g., in the sub-second regime. A high recognition rate has been observed.

According to examples, a time sequence of measurement frames of the radar measurement can be preprocessed to obtain the one or more 1-D time series of the observables of the radar measurement.

Specifically, in some scenarios it would be possible that multiple subsequent measurement frames are preprocessed to obtain the one or more 1-D time series. This means that a duration of each one of the one or more 1-D time series can be longer than the duration of each individual measurement frame. Typically, the physical frame duration of the measurement frames output by a radar sensor is in the order of tens of milliseconds (e.g., a typical repetition rate would be 30 Hz), which is much shorter than the typical duration of gestures to be classified, typically in the order of hundreds of milliseconds or even seconds. Accordingly, information from multiple subsequent measurement frames can be fused into the one or more 1-D time series so as to be able to coherently process respective time evolutions of the one or observables across the entire duration of the gesture using a classification algorithm.

Fusing the radar data of multiple subsequent measurement frames into the one or more 1-D time series allows for accurate gesture classification, because the entire gesture duration can be coherently processed.

There are various options available for determining the one or more 1-D time series. For instance, it would be possible to perform a Fourier transformation (FT) of the radar measurement data of each measurement frame along a fast-time dimension, to obtain a range-Doppler image (RDI).

In detail, a pre-processing of the raw data output from the analog-to-digital converter (ADC) could include a two dimensional (2-D) FT of a measurement frame structured into fast-time dimension, slow-time dimension and antenna channels. The 2-D FT can be along fast-time and slow-time dimension. This yields the RDI. Then, it would be possible to extract the range information, e.g., for the strongest peak in the RDI, considering that the object performing the gesture provides the highest signal level. The absolute signal level can also be extracted for the strongest peak. For example, the index of the range bin with the highest absolute value and the index of the Doppler bin with the highest absolute value could be extracted. Alternatively, within a certain area around the highest absolute value, the center of mass could be determined. The center of mass is then 2-D and the value of one dimension corresponds to the range value, the other to the Doppler value.

A beamforming algorithm—e.g., the 2-D CAPON—can be used. The 2-D CAPON also returns a 2-D matrix similar as the RDI. There the same extraction can be applied. Either using the index of the highest absolute value or center of mass.

When using the index of the bins with highest absolute value, it is possible to obtain integer values, whereas the center of mass techniques provides floating point numbers and thus is more accurate.

Another option for determining the 1-D time series is based on a complex-valued bandpass filter (BPF). For instance, the BPF could be implemented by a low-pass filter. The BPF can have a linear phase response. The BPF can be applied to the data samples of each one of multiple subsequent measurement frames along the fast-time dimension. The BPF outputs complex-valued signals for the measurement frames. These complex-valued signals can then be used to determine the 1-D time series.

Such techniques are based on the finding that, for near-field gesture sensing, it can be validly assumed that there is only a single target in the field of view and that the field of view is restricted to a certain range, e.g., 30 cm.

Therefore, a fine range resolution—e.g., based on RDI—may not be required, which comes with a high computational complexity. Instead, the BPF can be applied to the fast time dimension.

This has two positive effects. First, the BPF acts as a limitation of the field of view, which means that all motions outside the region of interest are blended out. Second, the signal is transformed to complex domain that allows access to the phase information. A computationally expensive FT is not required. RDI analysis is not required. This further reduces the computational burden and thus, facilitates, a short reaction time.

FIG. 1 schematically illustrates a system 65. The system 65 includes a radar sensor 70 and a processing device 60. The processing device 60 can obtain measurement data 64 from the radar sensor 70. For instance, the processing device could be an embedded device, a smartphone, a smart watch, etc.

A processor 62—e.g., a general purpose processor (central processing unit, CPU), a field-programmable gated array (FPGA), an application-specific integrated circuit (ASIC)—can receive the measurement data 64 via an interface 61 and process the measurement data 64. For instance, the measurement data 64 could include a time sequence of measurement frames, each measurement frame including samples of an ADC converter.

The processor 62 may load program code from a memory 63 and execute the program code. The processor 62 can then perform techniques as disclosed herein, e.g., pre-processing measurement data 64, predicting a motion class—e.g., a gesture class—based on the measurement data 64, controlling an HMI, etc.

Details with respect to such processing will be explained hereinafter in greater detail; first, however, details with respect to the radar sensor 70 will be explained.

Figure 2:
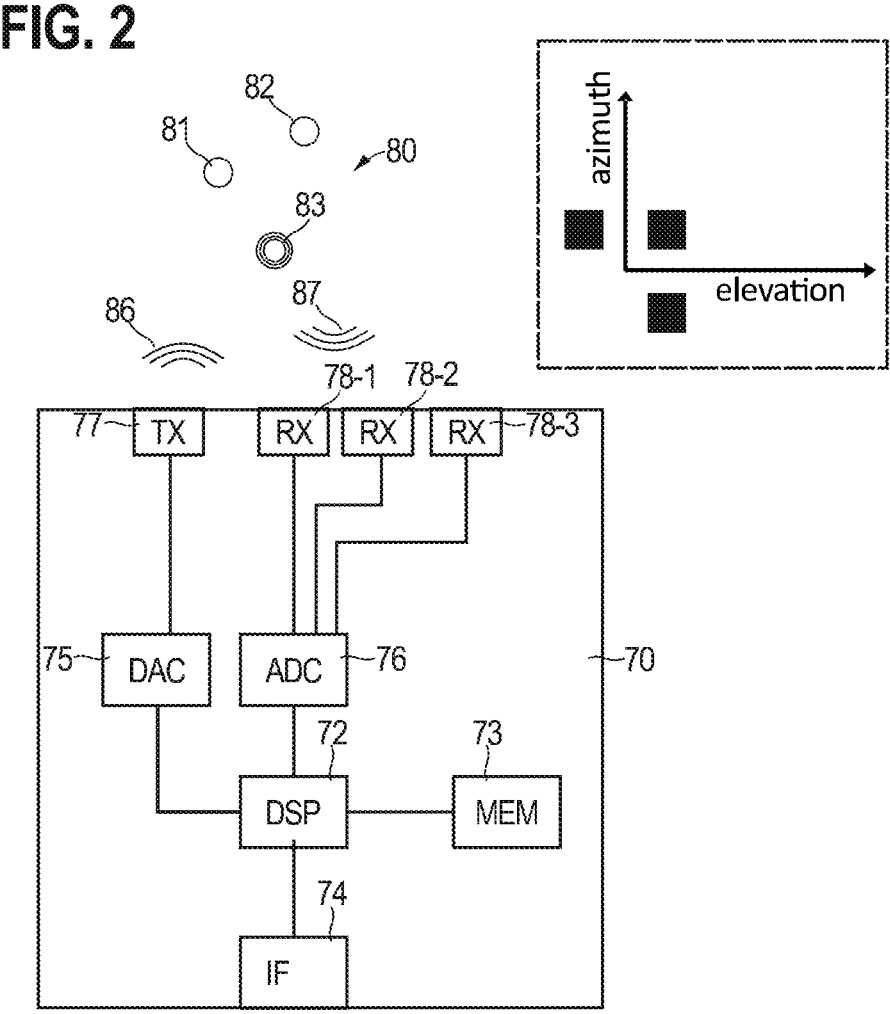
FIG. 2 schematically illustrates the radar sensor of FIG. 1 in further detail according to various examples.

FIG. 2 illustrates aspects with respect to the radar sensor 70. The radar sensor 70 includes a processor 72 (labeled digital signal processor, DSP) that is coupled with a memory 73. Based on program code that is stored in the memory 73, the processor 72 can perform various functions with respect to transmitting radar pulses 86 using a transmit antenna 77 and a digital-to-analog converter (DAC) 75. Once the radar pulses 86 have been reflected by a scene 80, respective reflected radar pulses 87 can be detected by the processor 72 using an ADC 76 and multiple receive antenna 78-1, 78-2, 78-3 (e.g., ordered in a L-shape with half a wavelength distance; see inset of FIG. 2, so that the phase differences between different pairs of the antennas address azimuthal and elevation angles, respectively). The processor 72 can process raw data samples obtained from the ADC 76 to some larger or smaller degree. For instance, measurement frames (sometimes also referred to as data frames or physical frames) could be determined and output.

The radar measurement can be implemented as a basic frequency-modulated continuous wave (FMCW) principle. A frequency chirp can be used to implement the radar pulse 86. A frequency of the chirp can be adjusted between a frequency range of 57 GHz to 64 GHz. The transmitted signal is backscattered and with a time delay corresponding to the distance of the reflecting object captured by all three receiving antennas. The received signal is then mixed with the transmitted signal and afterwards low pass filtered to obtain the intermediate signal. This signal is of significant lower frequency as the transmitted signal and therefore the sampling rate of the ADC 76 can be reduced accordingly. The ADC may work with a sampling frequency of 2 MHz and a 12-bit accuracy.

As illustrated, a scene 80 includes multiple objects 81-83. For instance, the objects 81, 82 may correspond to background, whereas the object 83 could pertain to a hand of a user—accordingly, the object 83 may be referred to as target or target object. Based on the radar measurements, gestures performed by the hand can be recognized. Some gestures are illustrated in FIG. 3.

Figure 3:
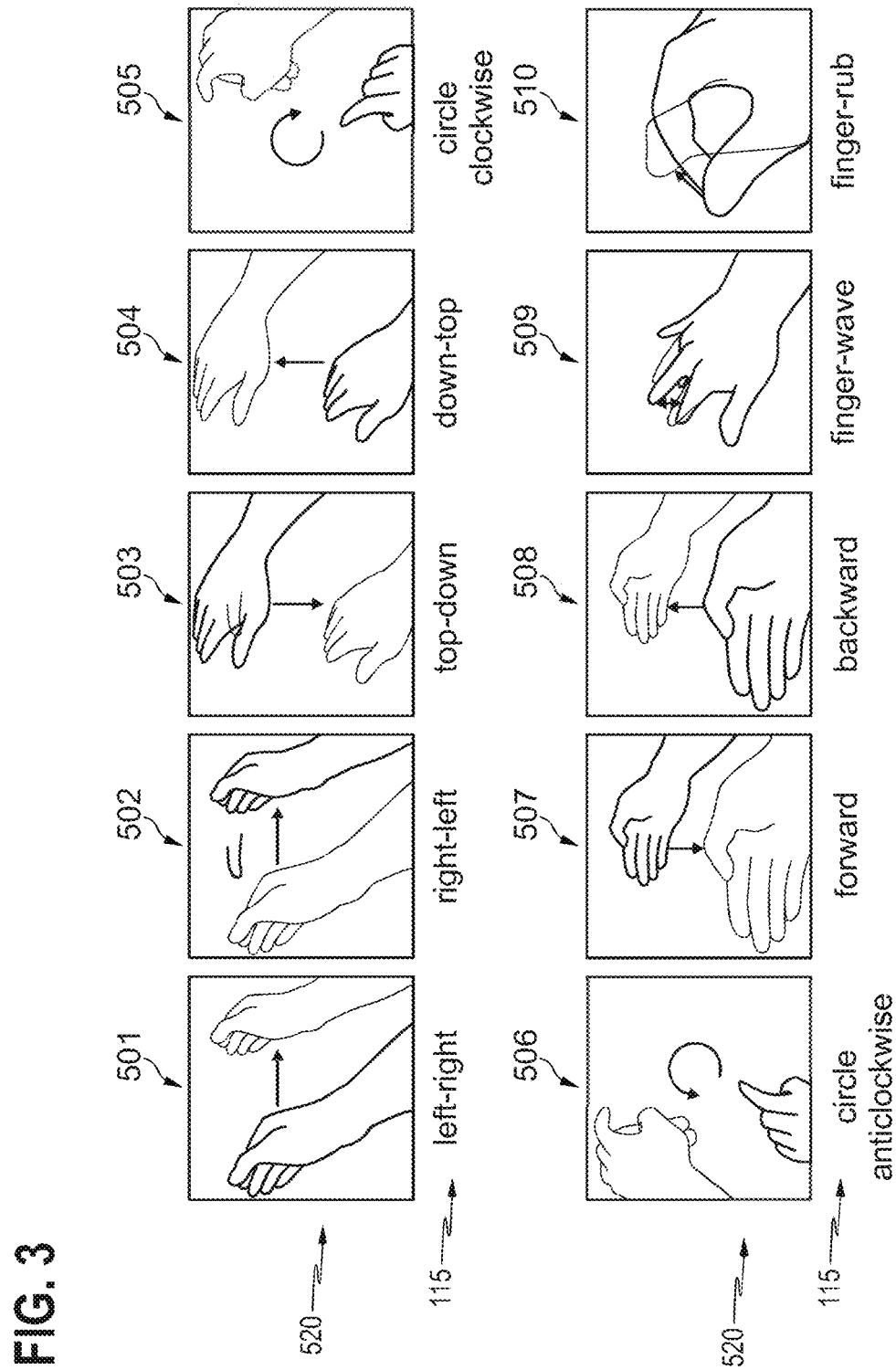
FIG. 3 schematically illustrates multiple gestures and associated gesture classes according to various examples.

FIG. 3 schematically illustrates such gestures 501-510 and corresponding labels 115 of gesture classes 520, but other gestures are possible. According to the techniques described herein, it is possible to reliably and accurately classify the gestures 501-510. Details with respect to such gesture classification are explained in connection with FIG. 4.

Figure 4:
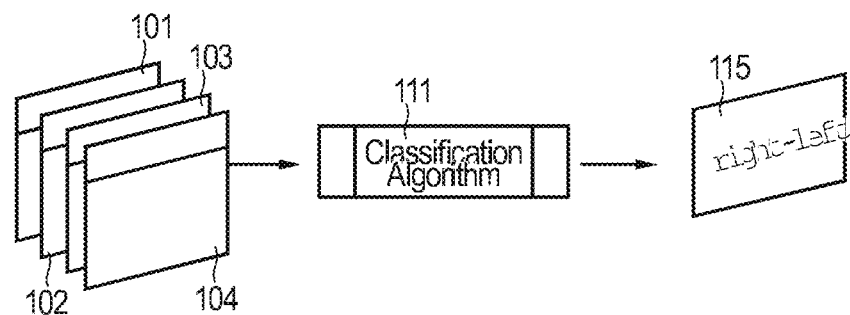
FIG. 4 schematically illustrates a processing pipeline for motion classification according to various examples.

FIG. 4 schematically illustrates a processing pipeline for implementing the gesture classification. For instance, such processing may be implemented by the processor 62 upon loading program code from the memory 63.

As illustrated in FIG. 4, a classification algorithm in obtains multiple 1-D time sequences 101-104 of respective observables of a radar measurement associated with a target object that performs a motion. Then, based on the multiple 1-D time series 101-104, the classification algorithm 111 determines a motion class of the motion performed by the object. A respective label 115 is output.

As a general rule, there are various options for implementing the classification algorithm 111. Some examples are summarized below in TAB. 2.

| | Implementation | Example details |
|---|---|---|
| I | CNN in feedforward architecture | For instance, the classification algorithm 111 could be implemented as a CNN. Here, since compact input data - e.g., the one or more 1-D time series or data derived therefrom - is used as an input, a compact implementation of the CNN would be possible. For instance, it has been observed that an implementation that includes 5 or fewer convolutional layers performing 1-D convolutions only for processing each one of the one or more 1-D time series yields accurate results. For example, a 3-layered 1-D CNN may be used. The first layer uses 32 filters with a kernel size of 64, the second and third layer are using 64 kernels with a filter width of 32. After each convolutional layer, an average pooling of size 2 can be performed and a rectified linear unit (ReLU) is applied as activation function. After the convolutional block, the tensor is flattened and fed into a fully connected layer with 32 output dimensions. Based on the output of this layer the classification is performed. For instance, an output of the CNN could be implemented by a fully-connected layer with a Softmax activation. This is only one option; a different scenario for the output layer is explained in example II below. |
| II | NN, e.g., CNN, with Euclidian distance-based output | It would also be possible to use an output of a NN, e.g., a CNN, that includes an output layer determining a Euclidian distance between an input sample vector and class weights associated with each one of respective candidate motion classes. Such techniques are based on the finding that, usually, a fully connected layer in a neural network is implemented by a matrix multiplication. Thus, the output is the scalar product of the input vector and the corresponding weight vector. If both vectors are normalized then the output is in fact the cosine similarity. Typically, the Euclidean distance is used as similarity measure. In this example, the last fully connected layer is replaced by a Euclidean distance layer, see Stadelmayer, T., Stadelmayer, M., Santra, A., Weigel, R., Lurz, F.: *Human activity classification using mm-wave FMCW radar by improved representation learning*. Proceedings of the 4th ACM Workshop on Millimeter-Wave Networks and Sensing Systems, pp. 1-6 (2020). The Euclidean distance layer outputs the Euclidean distance instead of the scalar product between input vector and each weight vector. The weight vectors can be interpreted as the centers of their corresponding gesture class. During training, the centers are shifting to optimal positions in the feature space. Unlike as |

| Implemen-tation | Example details |
|---|---|
| | proposed in T. Stadelmayer et al., where the distance to the class center is mapped to a class score followed by Softmax activation and a cross entropy loss function, it is possible to directly use the Euclidean distances, i.e., a Softmax activation is not required. |
| III CNN in recurrent architecture | In some examples, a recurrent architecture such as a long-short-term-memory (LSTM) architecture can be used. The LSTM architecture includes multiple units, each composed of a respective cell, input data, output data and forget gate. The cell can, respectively, be implemented by a respective CNN. Thereby, time-dependencies of the one or more 1-D time series can be evaluated using the recurrent structure of the LSTM architecture. |
| IV AENN | It would be possible to use an AENN. Here, the feature embedding can be used to determine the motion class. For instance, the position of the feature embedding for a given prediction can be compared with multiple predefined regions in the feature space. The different predefined regions can be obtained from training and can be respectively associated with different candidate motion classes. |

TAB. 2: Various options for implementation of a ML classification algorithm. It is, in principle, possible to combine multiple different types of ML classification algorithms to obtain alternative predictions.

While in FIG. 4, a count of four 1-D time series 101-104 is illustrated (e.g., range, absolute signal, azimuthal angle, elevation angle), as a general rule, fewer or more or other 1-D time series may be used as the input to the classification algorithm 111.

Figure 5:
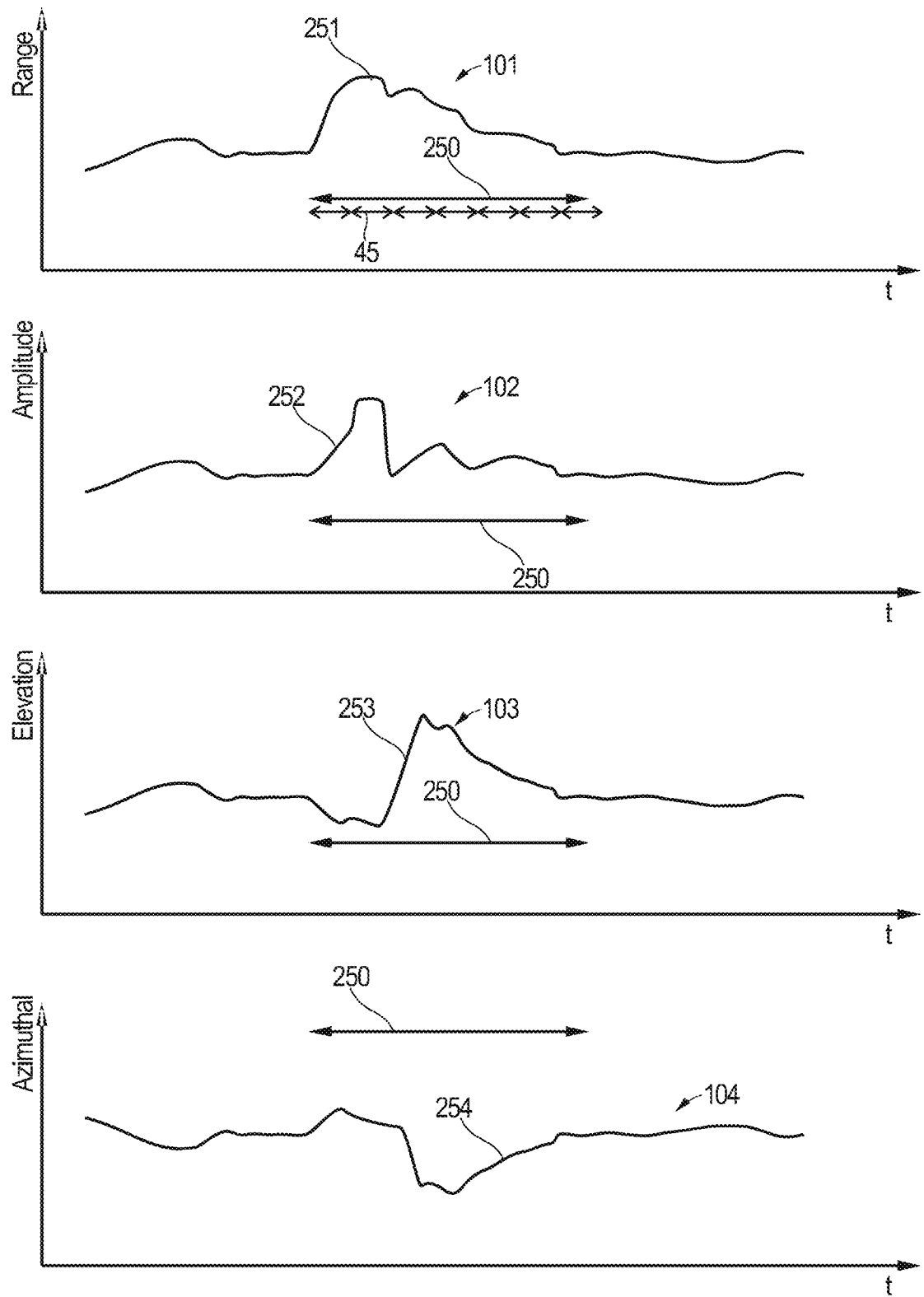
FIG. 5 illustrates multiple examples of one dimensional (1-D) time series obtained from radar measurement frames according to various examples.

FIG. 5 schematically illustrates aspects with respect to a 1-D time series 101. The time series 101 is indicative of a range 251 of the object. As illustrated in FIG. 5, the range 251 of the object changes during a gesture duration 250. A sequence of measurement frames 45 is obtained from the radar unit during the gesture duration and fused into the 1-D time series 251.

FIG. 5 also schematically illustrates aspects with respect to a 1-D time series 102. The time series 102 is indicative of the signal amplitude 252 of the signal contributions associated with the object. For instance, the signal amplitude 252 typically depends on the range 251 of the object, as well as on the radar cross-section of the object.

FIG. 5 further schematically illustrates aspects with respect to a 1-D time series 103.

The time series 103 is indicative of the elevation angle 253 of the object.

FIG. 5 still further schematically illustrates aspects with respect to a 1-D time series 104. The time series 104 is indicative of the azimuthal angle 254 of the object.

Figure 6:
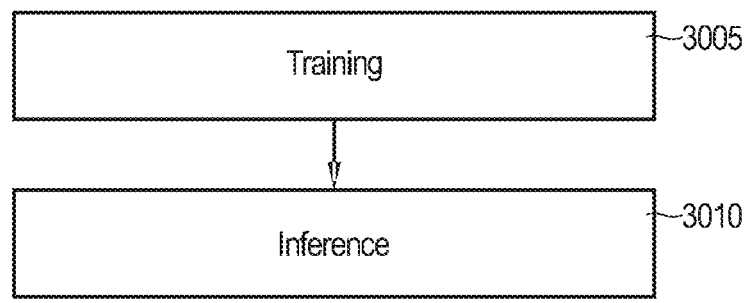
FIG. 6 schematically illustrates a flowchart of a method according to various examples.

FIG. 6 is a flowchart of a method according to various examples. The method can be executed by at least one processor, e.g., upon loading program code from a memory. For instances, the method of FIG. 6 could be executed by the processor 72 and/or the processor 62 (cf. FIGS. 1 and 2).

The method of FIG. 6 pertains to operation and maintenance of the classification algorithm 111.

At box 3005, a training of the classification algorithm 111 is implemented. Here, values of multiple parameters of the classification algorithm 111 are set.

For instance, for an ML classification algorithm 111—see TAB. 2—ML techniques can be used. Here, multiple training sets are obtained, each training set including a respective time sequence of measurement frames and an associated ground-truth label that is indicative of a respective candidate motion class selected from a plurality of candidate motion classes. I.e., the ground-truth label is indicative of the motion class of the motion executed by the object in the radar measurement data of the respective training set. The ground-truth label can be manually determined based on prior knowledge.

The training can be based one or more losses defined by a respective loss function. Each loss can correspond to a respective contribution of the loss function. Each loss can be determined based on a difference between a prediction of the NN in its current training state and a corresponding ground truth. The ground truth can be obtained from the ground-truth label or the training input, e.g., for an AENN. Different losses use different metrics to quantify such difference and/or use different predictions and/or inputs.

An iterative optimization can be implemented. Here, multiple sets can be used to adjust the weights in multiple iterations. Each iteration can include a backpropagation training algorithm to adjust the weights starting from an output layer of the NN towards an input layer.

There are various options available for implementing the loss functions. The particular training process and loss function can depend on the choice of the NN, cf. TAB. 2.

For instance, for TAB. 2: example I, a cross entropy loss can be used as conventionally done for Softmax activation.

For TAB. 2, example II, it would be to use a so-called orthogonal center loss, as defined in Eq. (4) below. Details with respect to the orthogonal center loss are explained below.

During training, the objective is to minimize the squared Euclidean distance to the own class center $m_p$—see Eq. (1)—and to maximize the Euclidean distances to all other or negative class centers $m_n$—see Eq. (2).

I.e., the first loss according to Eq. 1 penalizes the Euclidean distance to the class weights of the respective candidate motion class indicated by a ground-truth label (higher reward for smaller Euclidian distances); while the second loss according to Eq. 2 rewards the Euclidian distance (higher reward for larger distances) to the class weights of other candidate motion classes not indicated by that ground-truth label.

Such a disentangled intra class and inter class loss leads to more discriminative class clusters than maximizing only the intra class score as it is the case, e.g., for the cross-entropy loss. In addition, the class centers are regularized in a way that they are orthogonal to each other. This is achieved as defined in (3), where the means square error of the vector normalized and squared mean matrix M and the identity matrix I is calculated. This leads to an orthogonal signal subspace spanned by the class center vectors. Orthogonality is a valuable characteristic that can be used for detecting and rejection non-gesture motions or more generally spoken out of distribution samples.

$$L_{intra} = \|m_p - x\|_2^2 \tag{1}$$

$$L_{inter} = \sum_{n \in N} \|m_n - x\|_2^2 \tag{2}$$

$$R = MSE(I - MM^T) \tag{3}$$

$$L = \alpha_0 L_{intra} + \alpha_1 L_{inter} + \alpha_2 R \tag{4}$$

Next, for TAB. 2, example IV, a triplet loss may be used. Triplet loss is a metric learning technique that pulls together in feature space samples of the same class and pushes away, in feature space, dissimilar samples, i.e., samples belonging to different classes. Therefore, well-defined clusters are formed in the feature space and can be used as predefined region to which the feature position of the feature embedding in a prediction is compared. For instance, to determine the predefined region, the mean embedding vector of all training samples for each class can be determined. The predefined region can be centered at the mean embedding vector.

The triplet loss is generally known from Ge, W., Huang, W., Doug, D., Scott, M. R. (2018). *Deep Metric Learning with Hierarchical Triplet Loss*, In: Ferrari, V., Hebert, M., Sminchiseseu, C., Weiss, Y. (eds) Computer Vision—ECCV 2018, ECCV 2018, Lecture Notes in Computer Science( ) vol 11210. Springer, Charm The idea of the triplet loss is to feed three samples (i.e., three training sets of time series 101-104) into AENN in. The first training set is the anchor, the second training set is a random sample of the same gesture class and the third training set is a random sample of another gesture class.

The distance between anchor sample and either positive or negative sample is defined as $$d(x_1,x_2)=(x_1-x_2)^T(x_1-x_2) \quad (5)$$

where $x_1$ is the anchor and $x_2$ is either the positive or negative sample.

The triplet loss (based on Eq. 5) is defined as defined as $$L_{triplet}=\max(d(x_a,x_p)-d(x_a,x_n)+\alpha,0), \quad (6)$$

where $x_a$ defines the anchor sample, $x_p$ the positive sample and $x_p$ the negative sample. $\alpha$ is a hyper-parameter. As a result, the triplet loss evaluates the distance between single embedded feature vectors of anchor, positive and negative.

Once the training of box 3005 has been completed, inference can be implemented at box 3010. Here, a prediction of a gesture class of a gesture of a scene can be made without relying on corresponding ground truth. The weights of the NN as determined in the training of box 3005 are used.

Based on the inference at box 3010, it would be possible to implement one or more applications. For instance, it would be possible to control an HMI. A machine may be controlled using the HMI.

Figure 7:
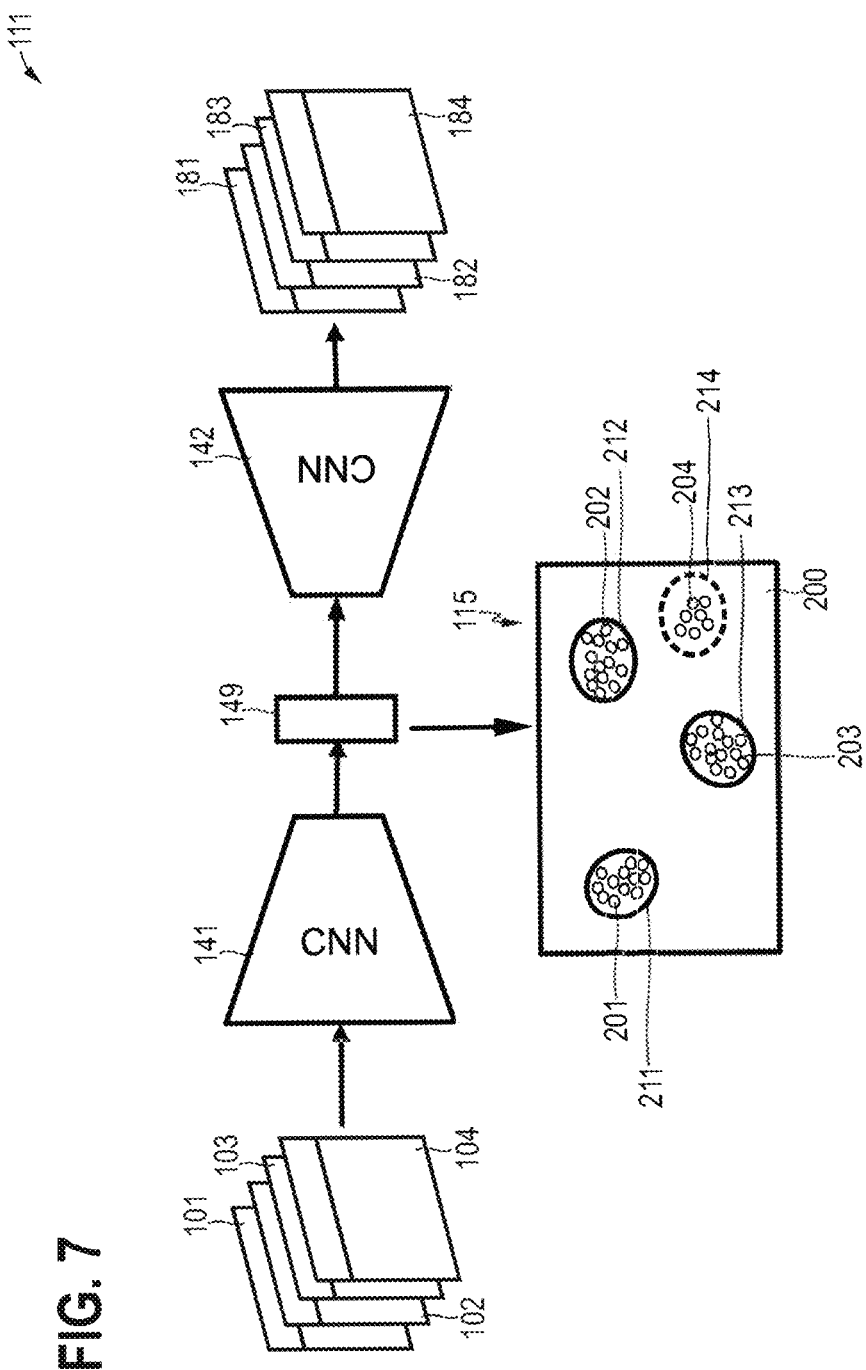
FIG. 7 schematically illustrates details of an auto-encoder neural network algorithm used for motion classification according to various examples.

FIG. 7 schematically illustrates aspects with respect to an implementation of the classification algorithm 111 as AENN. As illustrated in FIG. 7, the AENN includes an encoder branch 141 and a decoder branch 142. The decoder branch 142 operates on a feature embedding 149 representing latent features of the 1-D time series 101-104 provided as input to the encoder branch 141.

As a general rule, the decoder branch 142 may not be required during inference at box 3010 (cf. FIG. 5), but rather only during training at box 3005 to calculate a respective reconstruction loss. The decoder branch 142 outputs reconstructions 181-184 of the positional time spectrograms 101-104.

The gesture class 520 is predicted based on the feature embedding 149. The label 115—e.g., "L-R Swipe"—identifying the gesture class 520 is thus extracted from the feature embedding 149. This is explained in detail next.

In detail, it is possible to determine, for each one of multiple sets of 1-D time series 101-104, a respective data point 201-204 in latent feature space 200. I.e., each data point 201-204 describes a respective observation of a respective gesture. These data points 201-204 equate to or more generally are derived from the respective feature embedding 149.

Then, there can be predefined regions 211-213 defined in the feature space 200 and it can be checked whether the data points 201-204 are within one of these predefined regions 211-213.

These predefined regions 211-213 can be obtained from the training of the AENN, e.g., using a triplet loss as explained above in box 3010. They can be defined by the class average for all training sets of a given gesture class.

Also illustrated in FIG. 6 is a scenario in which multiple data points 204 form a cluster 214 that is offset from any one of the predefined regions 211-213. It would be possible to use such cluster 214 to define a new gesture class.

Figure 8:
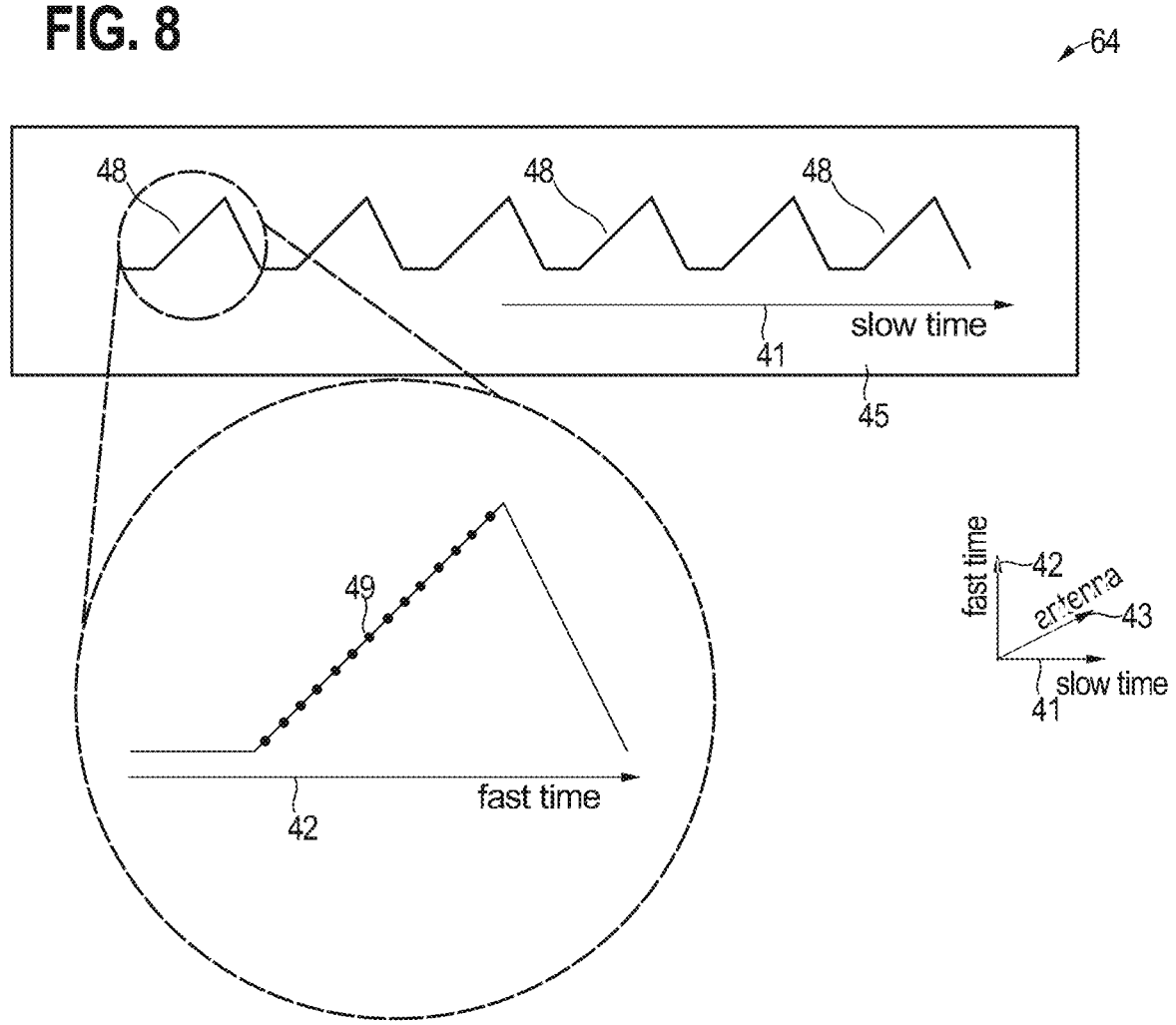
FIG. 8 schematically illustrates a measurement frame including data samples of radar measurement data according to various examples.

FIG. 8 schematically illustrates aspects with respect to the measurement data 64. FIG. 8 schematically illustrates a structure of raw data in form of a measurement frame 45.

Figure 9:
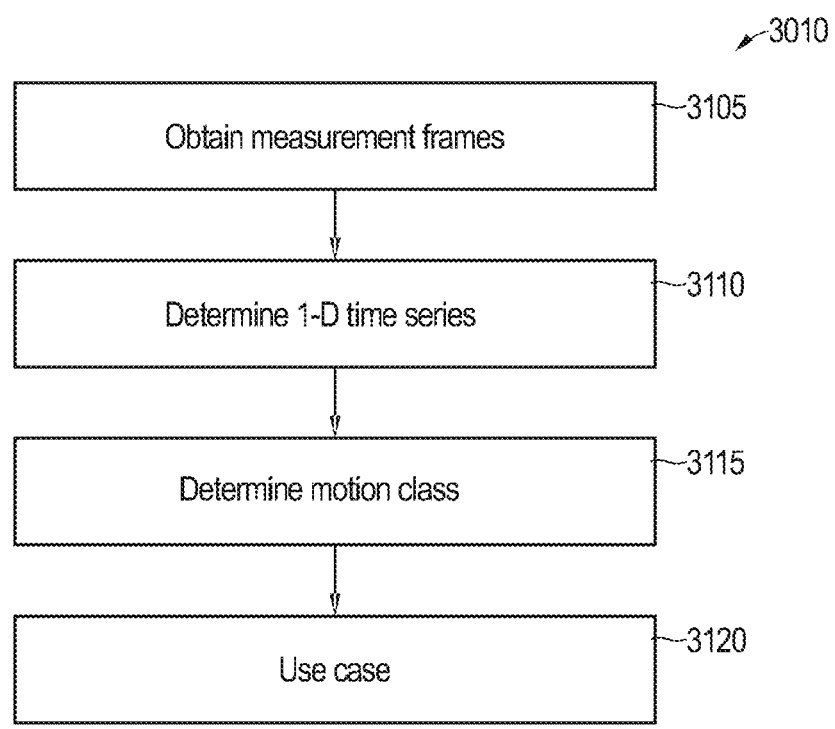
FIG. 9 is a flowchart of a method according to various examples.

Typically, a measurement frame 45 is defined by arranging data samples 49 obtained as raw data from the ADC (as explained in connection with FIG. 2) with respect to a fast-time dimension 42 and a slow-time dimension 41 (FIG. 9 is a schematic illustrative drawing; instead of sampling the received signal directly, the ADC samples a processed signal obtained from mixing the transmitted signal with the received signal; this is generally referred to as a Frequency-Modulated Continuous Wave, FMCW, radar measurement). A position along the fast time dimension 42 is incremented for each subsequent readout from the ADC (this is illustrated in the circular inset in FIG. 9), whereas a position along the slow time dimension 41 is incremented with respect to subsequent radar chirps 48. There can be an additional dimension which is the antenna or channel dimension 43 (not illustrated in FIG. 9), which provides angular resolution based on phase shifts of the incident electromagnetic waves between adjacent antennas. For instance, in FIG. 2, an example with three receive channels has been discussed.

The duration of the measurement frames 45 is typically defined by a measurement protocol. For instance, the measurement protocol can be configured to use 32 chirps within a measurement frame 45. The chirps repetition time is set to TPRT=0.39 ms, which results in a maximum resolve Doppler velocity of vmax=3.25 ms−1. The frequency of the chirps may range from fmin=58 GHz to fmax=63 GHz and therefore covers a bandwidth of B=5 GHz. Hence, the range resolution is Ar=3.0 cm. Each chirp is sampled 64 times with a sampling frequency of 2 MHz resulting in a total observable range of Rmax=0.96 m. Typically, the frame repetition frequency may be set to 30 frames per second.

FIG. 9 is a flowchart of a method according to various examples. The method of FIG. 9 may be executed by a processing device such as the processing device 60 of the system 65 illustrated in FIG. 1. For instance, the method may be executed by the processor 62 upon loading and executing program code from the memory 63.

FIG. 9 illustrates aspects with respect to inference. I.e., FIG. 9 can implement box 3010. FIG. 9 thus corresponds to determining a motion class or, more accurately, a prediction of the motion class without ground truth.

At box 3105, a time sequence of measurement frames of a radar measurement of a scene including an object is obtained. For instance, the time sequence may be obtained from the radar unit, e.g., from a digital signal processor coupled to an ADC. The time sequence could also be loaded from a memory.

At box 3110, one or more 1-D time series of respective observables of the radar measurement or determined, based on multiple subsequent measurement frames of the time sequence of measurement frames.

For instance, a complex-valued BPF with linear phase response may be applied to the data samples of each one of the multiple subsequent measurement frames along the fast-time dimension. Thereby, complex-valued signals are obtained for the measurement frames. These complex-valued signals are, accordingly, resolved along the slow-time dimension and along the channel dimension. It is then possible to determine the one or more time series based on the complex-valued signals.

Next, at box 3115, a motion class of a motion performed by the object is determined, using a classification algorithm and based on the one or more 1-D time series that are determined at box 3110.

Optionally, at box 3120, one or more use cases/applications may be facilitated by the motion class of the motion that it is determined at box 3115. For instance, an HMI may be controlled. A car trunk may be opened. Proximity sensing-based control of, e.g., a door-handle presenter in a car may be operated.

Figure 10:
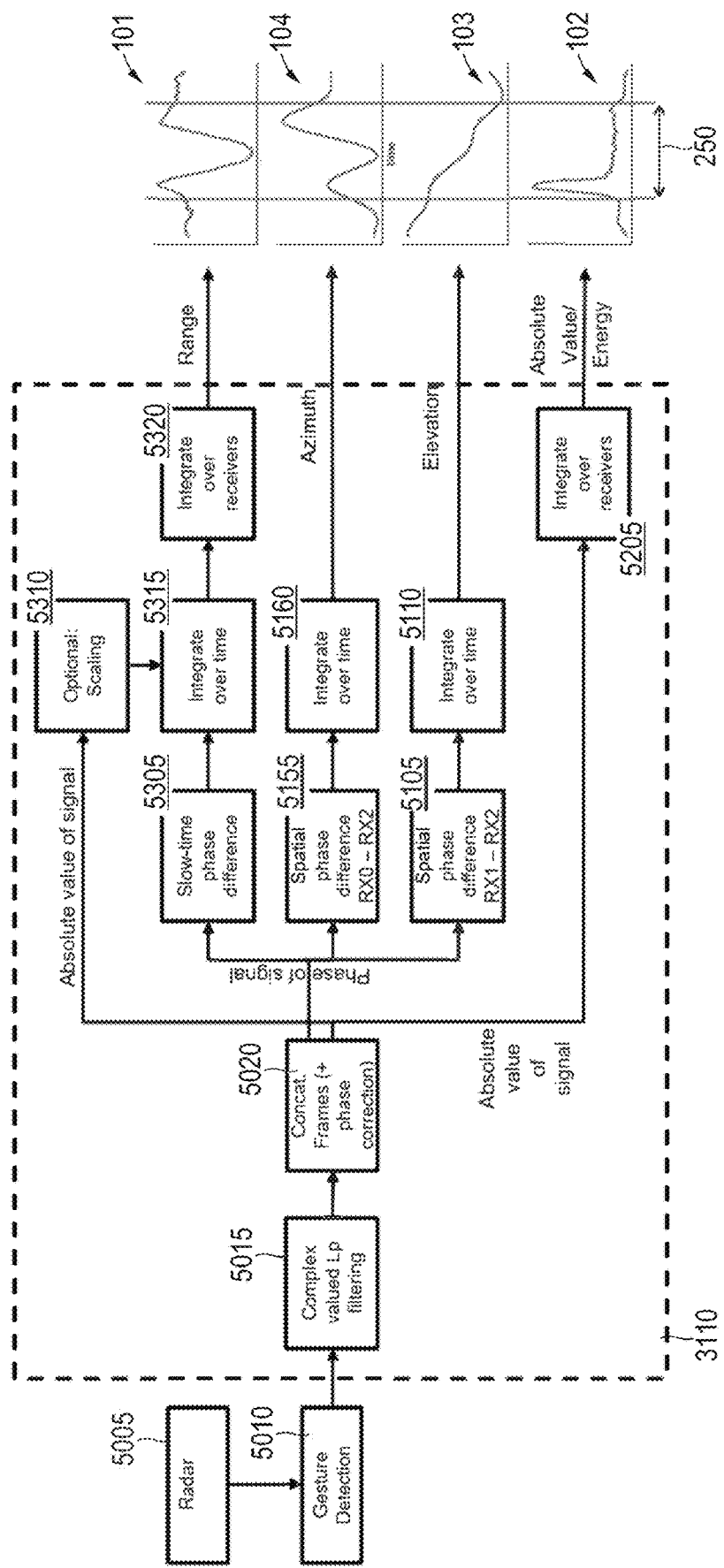
FIG. 10 is an example processing pipeline for determining 1-D time series using a low-pass filter according to various examples.

FIG. 10 illustrates the signal processing implementing boxes 3105 and 3110 in an example scenario.

At box 5005, the time sequence of measurement frames is obtained. This corresponds to box 3005.

At box 5010, it is optionally possible to perform a motion detection or specifically a gesture detection. Here, while a motion class may not be resolved, it is possible to determine a gesture duration 250. Measurement frames outside of the gesture duration 250 can be discarded. For instance, a signal change rate could be observed for such detection.

The measurement data provided by the radar unit is real valued. To obtain the motion and angle information, the phase of the signal is needed. To achieve this, in one scenario a FT is applied along fast time dimension. The frequencies within a chirp provide the range information of the received signal. After the FT, the signal is complex valued and hence angle or Doppler estimation can be done in a second step. The FT along fast-time dimension divides the signal into N range bins. These can be evaluated to obtain angle and range information, etc. (This processing is not shown in FIG. 10).

In another scenario—as illustrated in FIG. 10—it is possible to use a complex-valued BPF. For instance, a complex-valued 1-D SINC filter can be used at box 5015:

$$h[m,f_c,b]=2b\ \text{sinc}(2bt)(\cos(f_c mT)+j\ \sin(f_c mT)) \quad (7)$$

with $$m \in \left[-\left\lfloor\frac{M}{2}\right\rfloor;\left\lfloor\frac{M}{2}\right\rfloor\right],$$

where M is the filter length of the sinc BPF, T the sampling interval, $f_c$ the center frequency and b the bandwidth.

By using a 1-D BPF, it is possible to select the signal within a certain range area. A filtering along slow-time dimension/Doppler is not implemented. On the other hand, the filter is lightweight and fast.

Since the signal is static within a chirp, no convolution per se is performed but the fast-time samples can be multiplied/convolved with the complex-valued sinc BPF. Thus, the signal within a measurement frame—after applying the BPF—is complex valued and 1-D. The complex-valued signals (being resolved along slow-time dimension 41 and channel-dimension 43) are defined as:

$$s[f,r,n]=s[f,r,n,m]\cdot h[m,f_c,b] \quad (8)$$

where f, r, n and m are the measurement frame, channel, slow time and fast time indices, respectively.

The filter parameters $f_c$ and b may be predefined. For example, $f_c$ may be chosen to be 0.25 normalized frequency and b is set to 0.5 normalized frequency. For instance, the center frequency and the bandwidth can define a cut-off frequency. Typically, the cut-off frequency of the BPF can be set to a frequency associated with a range of less than 50 cm, for typical use case scenarios.

It would also be possible to set one or more of such filter parameters in an adaptive manner. This will be explained later in connection with FIG. 11.

Further, the complex-valued signals can be presented as absolute value $$a[f,r,n]=|s[f,r,n]| \quad (9)$$

and phase $$\Phi[f,r,n]=\arg(s[f,r,n])] \quad (10)$$

and flattened to a 1-D array per channel.

For the absolute value, a coherent integration (box 5205) over all receiving channels, i.e., across the channel dimension—is performed. As a result, the absolute signal becomes 1-D a[k] and the phase signal is two dimensional $\Phi[r,k]$, where r is the receiving channel index and k the time index.

The absolute signal a[k] can serve as or as basis of the 1-D time series 102 (cf. FIG. 5), e.g., when concatenated across multiple sequential frames.

Details with respect to such concatenation of the complex-valued signals obtained for the measurement frames 45 along the gesture duration 250 are explained next. This concatenation is implemented in box 5020.

The idle time between subsequent measurement frames 45 can cause a random phase offset between first sampling point in the frame f and the last sample in the preceding frame f−1.

To mitigate this phase offset between the complex-valued signals obtained for adjacent measurement frames, a phase correction factor is applied. The phase correction factor can be determined based on the phase offset, i.e., the difference of the phase signal of Eq. 10 is used.

The phase offset is defined as $$\Delta\Phi[r,k]=\Phi[r,k+1]-\Phi[r,k]. \quad (11)$$

To correct the random phase difference between last sample of previous frame and first sample of the new frame, the corresponding values in the phase difference signal $\Delta\Phi$ may be set to the mean of the preceding and succeeding value.

The phase correction factor can, accordingly be defined as $$\Delta\Phi[r,nN_c]=0.5(\Delta\Phi[r,nN_c+1]+\Delta\Phi[r,nN_c-1]) \quad (12)$$

where $N_c$ is the number of chirps per frame.

Various variants are conceivable for determining the phase correction factor and/or reconstructing the corrected phase signal.

First, the corrected phase differences can be integrated:

$$\Phi_{corr}[r,k]=\Phi[r,0]+\Sigma_{i=0}^{k}\Delta\Phi[r,i]. \quad (13)$$

By this procedure, the phase gets additionally unwrapped.

However, when no target is in the field of view, then random phase differences are summed up. Hence, to mitigate this effect, the phase correction factor can be determined based on, specifically scaled by the absolute value before integrating. This is, in particular, helpful for the determination of the range time series 101, because here—different to the determination of the angular time series 103, 104—the phase change over time is considered. Thus, if there is no target, which means that the absolute value will be low, then also the reconstructed phase signal stays constant. For instance, the phase correction factor may be set to zero where the absolute value of the complex-valued signals (Eq. 9) is below a certain threshold before integration, to thereby avoid summing up noise. Subsequently, the reconstructed phase signal can be integrated over the receiving channels. Such scaling of the phase correction factor based on the absolute signal level is illustrated in box 5310.

Next, after concatenation and phase correction and optional scaling, the time series 101-104 can be determined.

The time series 102 indicative of the absolute signal has been already discussed above and is obtained by integrating along the channel dimension (box 5205).

Next, time series 103 and 104 indicative of angular positions of the object 83 are discussed. The phase difference between receiving channels indicates the angle of arrival. As estimate for the azimuth angle the phase difference between a pair RX antennas—say antenna 0 and antenna 2—is used. Therefore, the time series 104 indicative of the azimuthal angle is defined as (box 5155):

$$\theta_{az} = \Phi[2, k] - \Phi[0, k]. \tag{14}$$

In the same way, for estimating the elevation angle—as another example of the angular position of the object—the phase difference between a pair of two further RX antennas (orthogonally arranged to the pair used for the azimuthal angle)—say antennas 1 and 2, for an L-shaped setup of antennas 0, 1, and 2 as illustrated in FIG. 2—is used and hence the time series 103 indicative of the elevation angle is defined as (box 5105):

$$\theta_{az} = \Phi[2,k] - \Phi[1,k]. \tag{15}$$

To increase the signal-to-noise ratio (SNR) of the angle estimation, both, the azimuth and elevation signals according to Eqs. 14 and 15 may be integrated over time (boxes 5110, 5160), i.e., along the slow-dime dimension. This yields time integrated phase differences. The slope of the time-integrated phase differences then represents the angle of arrival. The steeper it is the larger is the integrated phase offset, which means that the target is at the border of the field of view.

Note: The angle is actually defined by $$\arcsin\left(\frac{2\lambda\Delta\Phi}{2\pi d}\right).$$

However, when d~0.5 lambda (which is the case in the used radar) then for not too large phase differences the mapping is linear. Only for extreme values the phase difference to angle mapping is not linear anymore. Thus, as approximation the phase differences directly are used.

The range time series 101 is determined by determining the phase gradient of the complex-valued signals along the slow-time dimension (box 5305). This yields the velocity. Then an integration over time (box 5315) yields the range. At box 5320, a coherent integration across channel dimension is implemented, similar to box 5205.

Thus, summarizing, the radar signal is represented as four 1-D time series 101-104, namely the relative range, the integrated azimuth phase offset, the integrated elevation phase offset and the absolute value.

There are multiple advantages of using the time series 101-104 as described above. First, the signal was transformed from a 2-D and frame wise signal into a 1-D frame-continuous signal. Thus, a continuous 1-D convolution with individual kernel sizes can be applied in a convolutional layer without being restricted to the measurement frames 45. Second, the approach makes use of the fact that only a single target is within the field of view. In conventional processing, an FT resolves the entire range-Doppler domain in the RDI, however, when there is only a single target, most of the range Doppler bins will just be zero. With the presented data representation, only the target signal is captured. Third, due to integration the SNR of the phase, azimuth and elevation signal can be significantly improved. And forth, the target with the highest radar cross section, which is usually the palm of the hand for gesture sensing, leads to the lowest frequency part in the phase signal. Finger movements introduce phase offsets on top of this. Thus, by band pass filtering the macro motion of the hand and the micro motions of the fingers can be independently analyzed.

Figure 11:
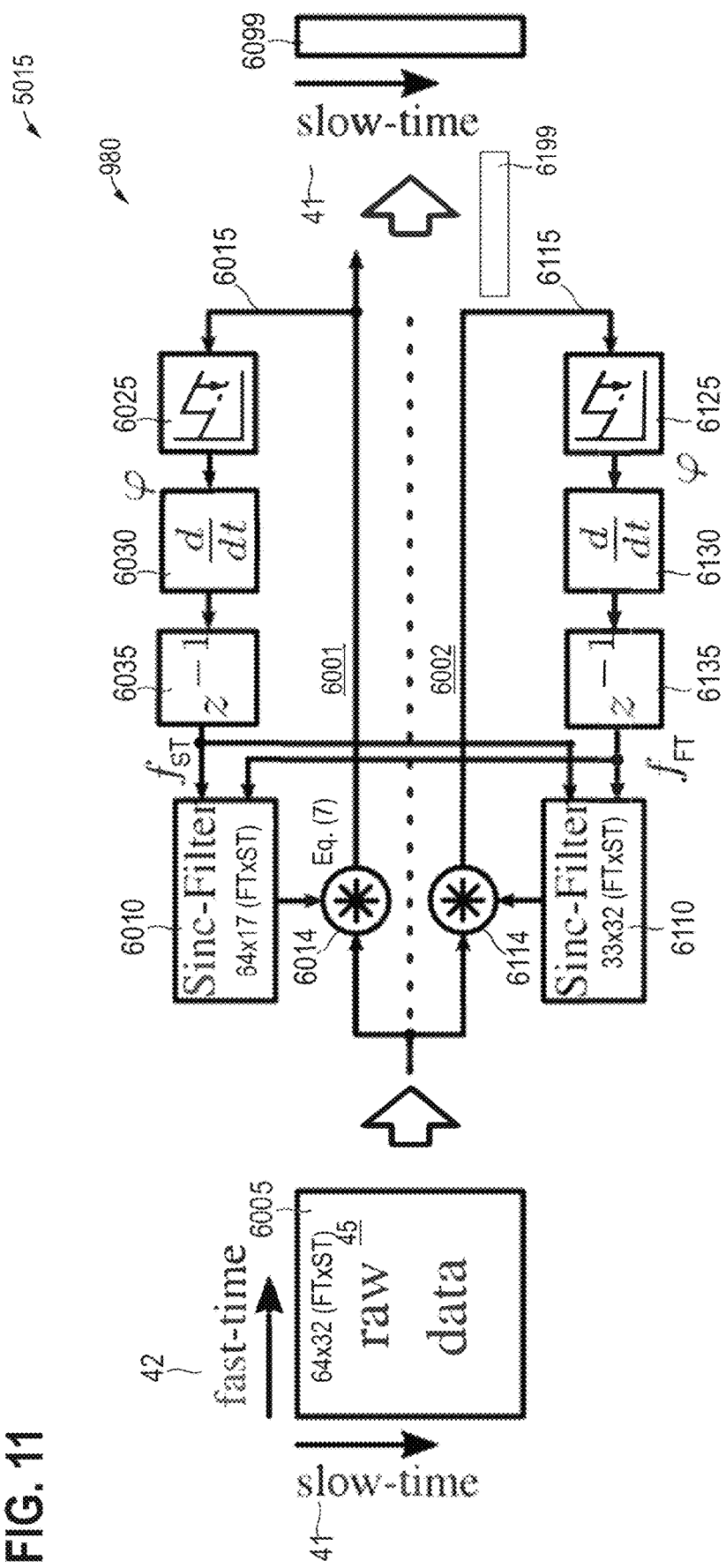
FIG. 11 is an example processing pipeline for adaptively setting the low-pass filter according to various examples.

FIG. 11 illustrates aspects with respect to the signal processing of the complex-valued BPF 980. Specifically, FIG. 11 illustrates a scenario where one or more filter parameters of the complex-value BPF are adaptive.

Such adaptive filtering is based on the finding that the target object may change its radial position or its radial velocity relative to the radar unit. Hence, it is helpful to adjust the one or more filter parameters such as the filter frequency to follow the object's movements.

An example implementation of associated processing is illustrated in FIG. 11. The processing of FIG. 11, accordingly, can implement box 5015 of FIG. 10 and can be part of box 3110 of FIG. 9.

In FIG. 11—for sake of simplicity—the channel dimension is omitted. The respective processing can be independently extended across multiple channel dimensions.

FIG. 11 schematically illustrates a 2-D BPF. A first branch 6001 is used to track the target position along the slow-time dimension (Doppler position); while a second branch 6002 is used to track the target position along the fast-time dimension (range position). In other words, in branch 6001 the center frequency for slow-time dimension ($f_{ST}$) is adapted; while in branch 6002 the center frequency for fast-time dimension ($f_{FT}$) is adapted.

Branch 6001 employs a 2-D convolution at 6014, between the measurement frame 45 and a respective filter kernel defined at box 6010.

Branch 6002 also employs a 2-D convolution at 6114, between the measurement frame 45 and a respective filter kernel defined at box 6110.

Thus, both branches 6001, 6002 employ a 2-D filtering. The filter kernels differ in dimensionality. This helps to resolve the signal along the particular dimension 41, 42 for which the respective center frequency is to be updated. The other dimension is collapsed.

The 1-D BPF filter of Eq. 7 can be seen as an extreme case of the 2-D BPF filter in branch 6001. The 1-D BPF of Eq. 7 corresponds to a degenerated 2-D BPF which has a filter dimension of 1 in slow-time dimension 41. By using a filter dimension of 1 in slow-time dimension 41, the Doppler selectivity is lost. The Doppler area selectivity makes sense if there are two targets moving with different speeds, which is motivated in connection with FIG. 12.

Figure 12:
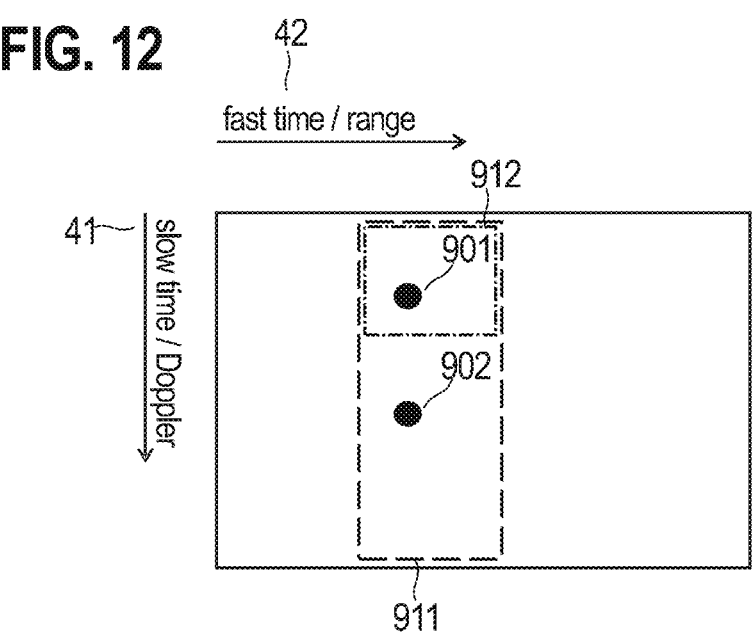
FIG. 12 schematically illustrates 1-D and 2-D filtering according to various examples.

FIG. 12 illustrates range-Doppler positions of two targets 901, 902. The two targets 901, 902 are at a similar range, but move in opposite direction. By using only a 1-D BPF filter according to Eq. 7, one can select the signal within a certain range area 911 (dashed line in FIG. 12). After filtering, the signal still contains a mixture of both targets 901, 902. Thus, it is not possible to accurately determine the range position (or fast time center frequency) of the target of interest, e.g., target 901. On the other hand, if a 2-D sinc filter (cf. FIG. 11) is employed, it is possible to select a filter area 912 constricted along, both, range dimension 42 as well as Doppler dimension 41. The targets 901, 902 can then be separated. By phase unwrapping, it is possible to determine the range position or fast-time center frequency of the target 901 of interest. This information will then be used to update the fast time center frequency of the 2-D BPF filter.

Now again referring to FIG. 11: FIG. 11 illustrates a measurement frame 45 that is input into the processing pipeline, at box 6005. The measurement frame 45 has a size of 64 along fast-time dimension 42 and a size of 32 along slow-time dimension 41.

Figure 13:
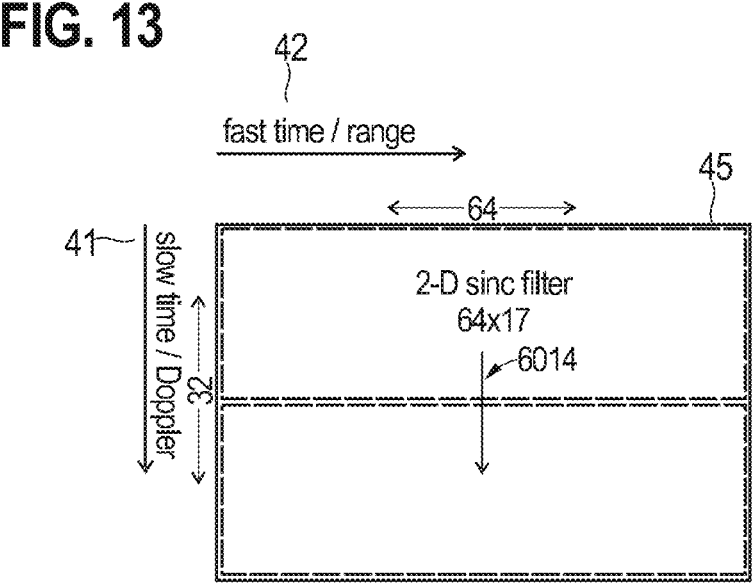
FIG. 13 schematically illustrates a 2-D convolution according to various examples.

Regarding the filter kernel determined at box 6010 for branch 6001: The filter length along the fast-time dimension 41 equals the number of samples per chirp (here: 64) and is smaller than the number of chirps along slow-time dimension (here: 17, which is smaller than 32). The raw signal of the current measurement frame 45 can be convolved, in branch 6002 at the 2-D convolution 6014, with this filter kernel without using zero padding along the fast-time dimension. Thus, the complex signal 6099 obtained for branch 6002 only includes a single value along fast-time dimension 42. However, along slow-time dimension 41, zero padding is used and thus a resolution along slow-time dimension is obtained for the complex signal 6099 in branch 6001: this complex-valued signal is within the range frequency region defined by the slow-time center frequency $f_{ST}$ and the fast-time $f_{FT}$ center frequency defined by the 2-D convolution of box 6014. In branch 6001, the output is a 1-D slow-time complex-valued signal 6099, that is on the one hand used to update the slow-time center frequency (feedback branch 6015) and on the other hand it is used for further processing (cf. FIG. 10). The complex-valued signal 6099 is used to determine the time series 101-104 (cf. FIG. 10; not shown in FIG. 11). The 2-D convolution 6014 of branch 6001 is illustrated in FIG. 13. The vertical arrow illustrates the convolution 6014. Generally, the output dimension after the convolution can be calculated as: "signal length—filter length+1". Thus, the dimension of the filtered/convolved signal is: 64−64+1=1. Thereby, the 1-D signal 6099 resolved along slow time is obtained, as discussed above.

Figure 14:
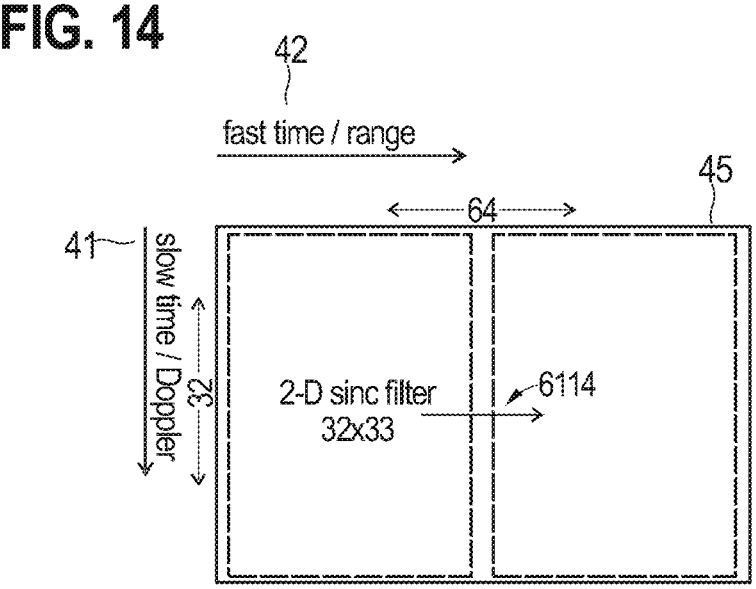
FIG. 14 schematically illustrates a 2-D convolution according to various examples.

The same procedure is done in branch 6002 where the 2-D convolution 6114 (cf. FIG. 14) is implemented with filter kernel length of 33 in fast-time dimension 42 and with filter length of 32 in slow-time dimension. Now, zero padding is only applied along fast-time dimension 42 (but not slow-time dimension 41) to obtain a 1-D range signal within the Doppler frequency region. The respective complex-valued signal 6199 is resolved along fast-time dimension and is thus used to update the center frequency along fast-time dimension 42.

Next, details with respect to the feedback branches 6015, 6115 are determined.

In the scenario of FIG. 11, the center frequencies are iteratively adapted for subsequent measurement frames 45, for each branch 6001, 6002. This iterative nature of the adaption is illustrated by the box 6035 where a respective delay path is indicated. Phase unwrapping is achieved by box 6025. Phase differences larger than Pi are corrected by subtracting 2Pi; phase differences smaller than −Pi are corrected by adding 2Pi. The new center frequency is determined based on a phase gradient that is determined in box 6030. The average angular velocity for each complex 1-D signal of branch 6001 and branch 6002 is determined using $$\omega_{avg} = 1/(N-1) \sum_{n=1}^{N} (\phi(s[n]) - \phi(s[n-1]))$$

where $\phi$ the phase of the respective signal. Based on the average angular velocity the center frequency for the new time step can be updated by $$f_{c,t+\Delta t} = \frac{\omega_{avg}}{2\pi}$$

for slow-time dimension and fast-time dimension independently in the same manner.

The processing of branch 6002 also corresponds to the processing in branch 6001, i.e., box 6125 corresponds to box 6025, box 6130 corresponds to box 6030, box 6135 corresponds to box 6035, and box 6110 corresponds to box 6010.

Thus, as will be appreciated from the above, the fast-time center frequency $f_{FT}$ in branch 6002 as well as the slow-time center frequency $f_{ST}$ in branch 6001 are adapted according to the current observed signal. This is done for each dimension independently using the two branches 6001, 6002, but in the same manner.

By this, the 2-D BPF is tracking the target in range-Doppler domain by completely operating on the raw time domain data.

Note that, in general, it would also be possible to implement a 2-D BPF that uses two static center frequencies or one adaptively adjusted center frequency (e.g., feedback loop 6015, only) and one static center frequency.

Summarizing, above, techniques of performing a gesture classification of a gesture performed by an object such as a hand or finger are disclosed. The gesture classification is based on a radar measurement. To predict the gesture class, a ML algorithm can be used. One or more time series of range, angular position and/or absolute signal level can be used as input, concatenated across multiple measurement frames.

It has been disclosed how to transform the raw radar signal into multiple 1-D time series before feeding it into a classification algorithm.

This is a compact representation and has a lower computational complexity as conventional pre-processing methods using FFTs. However, no information about the hand motion is lost by the transformation, which leads to very good classification accuracies.

Since the signal is represented as multiple 1-D time series, it is possible to use a 1-D CNN as the classification algorithm, instead of a 2-D CNN as it is the case for interpreting the FT pre-processed feature maps. Thus, the classification algorithm and the computational complexity of the classification algorithm can be significantly reduced. Further, no specialized digital signal processing hardware is used for pre-processing the radar data.

Moreover, since the signal is not resolved in range direction, the bandwidth of the transmit chirps can be lowered below 500 MHz, which makes the system FCC compliant.

Thus, at least the following EXAMPLES have been disclosed.

EXAMPLE 1. A computer-implemented method, the method comprising:
  obtaining a time sequence of measurement frames (45) of a radar measurement of a scene (80) comprising an object (83),
  based on multiple subsequent measurement frames (45) of the time sequence of measurement frames (45), determining one or more one dimensional, 1-D, time series (101, 102, 103, 104) of respective observables of the radar measurement associated with the object (83), and
  based on the one or more 1-D time series (101, 102, 103, 104), determining a motion class of a motion performed by the object (83) using a classification algorithm (111).

EXAMPLE 2. The computer-implemented method of EXAMPLE 1,
  wherein each measurement frame (45) of the time sequence of measurement frames (45) comprises data samples along a fast-time dimension (42), a slow-time dimension (41), and a channel dimension (43), a slow time of the slow-time dimension (41) being incremented with respect to adjacent radar chirps of the radar measurement, a fast time of the fast-time dimension (42) being incremented with respect to adjacent data samples, a channel of the channel dimension (43) being incremented for different receiver antennas (78-1, 78-2, 78-3) used for the radar measurement,
  wherein the method further comprising:
  applying a complex-valued bandpass filter (980) to the data samples of each one of the multiple subsequent measurement frames (45), to filter along the fast-time dimension (42),
  wherein the applying of the complex-valued bandpass filter (980) yields complex-valued signals (6099) resolved along the slow-time dimension (41).

EXAMPLE 3. The computer-implemented method of EXAMPLE 2, further comprising:
  based on a phase gradient of the complex-valued signals (6099), iteratively adapting (6035) a slow-time filter frequency of the complex-valued bandpass filter (980) for subsequent ones of the multiple subsequent measurement frames (45).

EXAMPLE 4. The computer-implemented method of EXAMPLE 2 or 3, further comprising:
  wherein a first 1-D time series (102) of the one or more 1-D time series (101, 102, 103, 104) indicative of a signal amplitude (252) determined by integrating an absolute value of the complex-valued signals (6099) across the channel dimension (43).

EXAMPLE 5. The computer-implemented method of any one of EXAMPLES 2 to 4,
  wherein at least one second 1-D time series (103, 104) of the one or more 1-D time series (101, 102, 103, 104) indicative of at least one angular position (253, 254) of the object (83) is determined based on phase differences (5105, 5155) of the complex-valued signals (6099) between respective pairs of the channels (78-1, 78-2, 78-3) of the channel dimension (43).

EXAMPLE 6. The computer-implemented method of EXAMPLE 5, further comprising:
  integrating (5110, 5160, along the slow-time dimension (41), the phase differences of the complex-valued signals (6099) between the respective pairs of the channels (78-1, 78-2, 78-3) of the channel dimension (43), to thereby obtain time-integrated phase differences,
  wherein the phase differences are determined based on a slope of each one of the time-integrated phase differences.

EXAMPLE 7. The computer-implemented method of any one of EXAMPLES 2 to 6,
  wherein a third 1-D time series (101) of the one or more 1-D time series (101, 102, 103, 104) indicative of a range position (251) of the object (83) is determined based on a phase gradient (5305) of the complex-valued signals (6099) along the slow-time dimension (41) and by respectively integrating (5320) the phase gradient of the complex-valued signals (6099) across the channel dimension (43).

EXAMPLE 8. The computer-implemented method of any one of EXAMPLES 2 to 7, further comprising:
  concatenating (5020) the complex-valued signals (6099) obtained for the measurement frames (45).

EXAMPLE 9. The computer-implemented method of EXAMPLE 8,
  wherein the concatenating (5020) further comprises:
  applying a phase correction factor to reduce phase offsets between the complex-valued signals (6099) obtained for adjacent ones of the multiple subsequent measurement frames (45).

EXAMPLE 10. The computer-implemented method of EXAMPLE 9,
  wherein the phase correction factor is determined based on the phase offsets.

EXAMPLE 11. The computer-implemented method of EXAMPLE 9 or 10,
  wherein the phase correction factor is determined based on an absolute value of the respective complex-valued signals (6099).

EXAMPLE 12. The computer-implemented method of any one of EXAMPLES 2 to 11,
  wherein a cut-off frequency of the complex-valued bandpass filter is at a frequency associated with a range of less than 50 cm.

EXAMPLE 13. The computer-implemented method of any one of EXAMPLES 2 to 12,
  wherein the complex-valued bandpass filter further filters along the slow-time dimension (41).

EXAMPLE 14. The computer-implemented method of EXAMPLE 13,
  wherein the applying of the complex-valued bandpass filter (980) yields further complex-valued signals (6199) resolved along the fast-time dimension (42),
  wherein the method further comprises:
  based on a phase gradient of the further complex-valued signals (6199), iteratively adapting (6135) a fast-time filter frequency of the complex-valued bandpass filter (980) for subsequent ones of the multiple subsequent measurement frames (45).

EXAMPLE 15. The computer-implemented method of any one of the preceding EXAMPLES,
  wherein the classification algorithm (111) comprises a convolutional neural network algorithm,
  wherein the convolutional neural network algorithm comprises five or fewer convolutional layers performing 1-D convolutions.

EXAMPLE 16. The computer-implemented method of any one of the preceding EXAMPLES,
  wherein the classification algorithm (111) comprises an autoencoder neural network algorithm,
  wherein the motion class is determining based on a feature embedding (149) of the autoencoder neural network algorithm (111) and multiple regions (211, 212, 213) predefined in a feature space of the feature embedding (149) and associated with each one of a plurality of candidate motion classes (520).

EXAMPLE 17. The computer-implemented method of any one of the preceding EXAMPLES,
wherein the classification algorithm (111) comprises a convolutional neural network algorithm,
wherein the convolutional neural network algorithm comprises an output layer determining a Euclidean distance between an input sample vector and class weights associated with each one of a plurality of candidate motion classes.

EXAMPLE 18. The computer-implemented method of any one of the preceding EXAMPLES,
wherein the classification algorithm (111) comprises a convolutional neural network algorithm,
wherein the convolutional neural network algorithm comprises a recurrent architecture.

EXAMPLE 19. A computer-implemented method of training (3005) a convolutional neural network algorithm (111) for predicting a gesture class (520) of a motion performed by an object (83) based on a time sequence of measurement frames (45) of a radar measurement of a scene (80) comprising the object (83), the convolutional neural network algorithm (11) comprising an output layer determining an Euclidean distance between an input sample vector and class weights of each one of a plurality of candidate motion classes,
wherein the method comprises:
obtaining multiple training sets, each training set comprising a respective time sequence of measurement frames (45) and an associated ground truth label (115), the ground truth label (115) being indicative of a respective candidate motion class (520) selected from the plurality of candidate motion classes (520), and
training the convolutional neural network algorithm (111) based on a first loss that penalizes the Euclidean distance to the class weights of the respective candidate motion class indicated by the ground-truth label (115) and further based on a second loss that rewards the Euclidean distance to the class weights of other candidate motion classes not indicated by the ground-truth label.

EXAMPLE 20. A device (60) comprising a processor (62) configured to:
obtain a time sequence of measurement frames (45) of a radar measurement of a scene (80) comprising an object (83),
based on multiple subsequent measurement frames (45) of the time sequence of measurement frames (45), determine one or more one dimensional, 1-D, time series (101, 102, 103, 104) of respective observables of the radar measurement associated with the object (83), and
based on the one or more 1-D time series (101, 102, 103, 104), determine a motion class of a motion performed by the object (83) using a classification algorithm (11).

EXAMPLE 21. The device (60) of EXAMPLE 20, wherein the processor is configured to perform the method of any one of EXAMPLES 1 to 18.

EXAMPLE 22. A device (60) comprising a processor (62) for training (3005) a convolutional neural network algorithm (111) for predicting a gesture class (520) of a motion performed by an object (83) based on a time sequence of measurement frames (45) of a radar measurement of a scene (80) comprising the object (83), the convolutional neural network algorithm (111) comprising an output layer determining an Euclidean distance between an input sample vector and class weights of each one of a plurality of candidate motion classes, wherein the processor is configured to:
obtain multiple training sets, each training set comprising a respective time sequence of measurement frames (45) and an associated ground truth label (115), the ground truth label (115) being indicative of a respective candidate motion class (520) selected from the plurality of candidate motion classes (520), and
train the convolutional neural network algorithm (111) based on a first loss that penalizes the Euclidean distance to the class weights of the respective candidate motion class indicated by the ground-truth label (115) and further based on a second loss that rewards the Euclidean distance to the class weights of other candidate motion classes not indicated by the ground-truth label.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, the possible gesture classification is not limited to just hand gesture but virtually any form of gesture feedback such as body pose or facial expressions. General motions may be detected.

For further illustration, while a sinc BPF has been disclosed in connection with the determining of the 1-D time series, other types of bandpass filters may be used.

What is claimed is:

1. A computer-implemented method, the method comprising:
obtaining a time sequence of measurement frames of a radar measurement of a scene comprising an object, wherein each measurement frame of the time sequence of measurement frames comprises data samples along a fast-time dimension, a slow-time dimension, and a channel dimension, a slow time of the slow-time dimension being incremented with respect to adjacent radar chirps of the radar measurement, a fast time of the fast-time dimension being incremented with respect to adjacent data samples, a channel of the channel dimension being incremented for different receiver antennas used for the radar measurement;
based on multiple subsequent measurement frames of the time sequence of measurement frames, determining one or more one-dimensional (1-D) time series of respective observables of the radar measurement associated with the object, wherein determining the one or more 1-D time series comprises using only time-domain signal processing, and at least one 1-D time series of the one or more 1-D time series is indicative of at least one angular position of the object; and
based on the one or more 1-D time series, determining a motion class of a motion performed by the object using a classification algorithm.

2. The computer-implemented method of claim 1, further comprising:
applying a complex-valued bandpass filter to the data samples of each one of the multiple subsequent measurement frames, to filter along the fast-time dimension; and
wherein the applying of the complex-valued bandpass filter yields complex-valued signals resolved along the slow-time dimension.

3. The computer-implemented method of claim 2, further comprising:
based on a phase gradient of the complex-valued signals, iteratively adapting a slow-time filter frequency of the complex-valued bandpass filter for subsequent ones of the multiple subsequent measurement frames.

4. The computer-implemented method of claim 2, wherein determining the one or more 1-D time series comprises integrating an absolute value of the complex-valued signals across the channel dimension to form a first 1-D time series of the one or more 1-D time series indicative of a signal amplitude.

5. The computer-implemented method of claim 4, wherein at least one second 1-D time series of the one or more 1-D time series is the at least one 1-D time series indicative of the at least one angular position of the object, wherein the second 1-D time series is determined based on phase differences of the complex-valued signals between respective pairs of channels of the channel dimension.

6. The computer-implemented method of claim 5, further comprising:
integrating, along the slow-time dimension, the phase differences of the complex-valued signals between the respective pairs of the channels of the channel dimension, to thereby obtain time-integrated phase differences,
wherein the phase differences are determined based on a slope of each one of the time-integrated phase differences.

7. The computer-implemented method of claim 5,
wherein a third 1-D time series of the one or more 1-D time series indicative of a range position of the object is determined based on a phase gradient of the complex-valued signals along the slow-time dimension and by respectively integrating the phase gradient of the complex-valued signals across the channel dimension.

8. The computer-implemented method of claim 2, further comprising concatenating the complex-valued signals obtained for the measurement frames.

9. The computer-implemented method of claim 8, wherein the concatenating further comprises applying a phase correction factor to reduce phase offsets between the complex-valued signals obtained for adjacent ones of the multiple subsequent measurement frames.

10. The computer-implemented method of claim 9, wherein the phase correction factor is determined based on the phase offsets.

11. The computer-implemented method of claim 9, wherein the phase correction factor is determined based on an absolute value of the respective complex-valued signals.

12. The computer-implemented method of claim 2, further comprising filtering, by the complex-valued bandpass filter, along the slow-time dimension.

13. The computer-implemented method of claim 12,
wherein applying of the complex-valued bandpass filter yields further complex-valued signals resolved along the fast-time dimension; and
wherein the method further comprises:
based on a phase gradient of the further complex-valued signals, iteratively adapting a fast-time filter frequency of the complex-valued bandpass filter for subsequent ones of the multiple subsequent measurement frames.

14. The computer-implemented method of claim 1,
wherein the classification algorithm comprises an autoencoder neural network algorithm; and
wherein the motion class is determined based on a feature embedding of the autoencoder neural network algorithm and multiple regions predefined in a feature space of the feature embedding and associated with each one of a plurality of candidate motion classes.

15. The computer-implemented method of claim 1,
wherein the classification algorithm comprises a convolutional neural network algorithm; and
wherein the convolutional neural network algorithm comprises an output layer determining a Euclidean distance between an input sample vector and class weights associated with each one of a plurality of candidate motion classes.

16. A millimeter-wave radar system comprising:
a millimeter-wave radar sensor configured to transmit radar signals, receive reflected radar signals, and generate radar digital data based on the reflected radar signals; and
a processing system configured to:
obtain a time sequence of measurement frames of a radar measurement of a scene comprising an object from the radar digital data, wherein each measurement frame of the time sequence of measurement frames comprises data samples along a fast-time dimension, a slow-time dimension, and a channel dimension, a slow time of the slow-time dimension being incremented with respect to adjacent radar chirps of the radar measurement, a fast time of the fast-time dimension being incremented with respect to adjacent data samples, a channel of the channel dimension being incremented for different receiver antennas used for the radar measurement,
based on multiple subsequent measurement frames of the time sequence of measurement frames, determine one or more one-dimensional (1-D) time series of respective observables of the radar measurement associated with the object, wherein determining the one or more 1-D time series comprises using only time-domain signal processing, and at least one 1-D time series of the one or more 1-D time series is indicative of at least one angular position of the object, and
based on the one or more 1-D time series, determine a motion class of a motion performed by the object using a classification algorithm.

17. The millimeter-wave radar system of claim 16, wherein the classification algorithm comprises an autoencoder neural network algorithm; and
wherein the motion class is determined based on a feature embedding of the autoencoder neural network algorithm and multiple regions predefined in a feature space of the feature embedding and associated with each one of a plurality of candidate motion classes.

18. A method comprising:
obtaining a time sequence of measurement frames of a radar measurement of a scene comprising an object;
applying a plurality of complex-valued bandpass filters to the radar measurement along a fast-time dimension to produce a corresponding plurality of complex-valued time-domain signals resolved along a slow-time dimension;
determining at least one phase difference between the plurality of complex-valued time-domain signals to determine an angular position of the object; and
determining a class of motion performed by the object based on the plurality of complex-valued time-domain signals and the determined angular position.

19. The method of claim 18, wherein determining the class of motion comprises using an autoencoder neural network algorithm.

20. The method of claim 18, wherein the plurality of complex-valued bandpass filters comprises at least one sinc filter.

21. The method of claim 18, wherein:
- each measurement frame of the time sequence of measurement frames comprises data samples along a fast-time dimension, a slow-time dimension, and a channel dimension, a slow time of the slow-time dimension being incremented with respect to adjacent radar chirps of the radar measurement, a fast time of the fast-time dimension being incremented with respect to adjacent data samples, a channel of the channel dimension being incremented for different receiver antennas used for the radar measurement; and
- the method further comprises determining the angular position of the object based on the determined at least one phase difference using only time-domain processing.

* * * * *